(12) United States Patent
Smith et al.

(10) Patent No.: US 7,871,527 B2
(45) Date of Patent: *Jan. 18, 2011

(54) PROCESSES FOR WATER AND WASTEWATER TREATMENT, INCLUDING STATIONARY CLOTH MEDIA FILTRATION

(75) Inventors: David Smith, Beloit, WI (US); Paul A. Hughes, Clovis, CA (US); Lloyd W. Johnson, Roscoe, IL (US); Peter G. Baumann, Roscoe, IL (US)

(73) Assignee: Aqua-Aerobic Systems, Inc., Loves Park, IL (US)

( * ) Notice: Subject to any disclaimer, the term of this patent is extended or adjusted under 35 U.S.C. 154(b) by 252 days.

This patent is subject to a terminal disclaimer.

(21) Appl. No.: 11/005,561

(22) Filed: Dec. 6, 2004

(65) Prior Publication Data

US 2005/0115911 A1    Jun. 2, 2005

Related U.S. Application Data

(62) Division of application No. 10/329,630, filed on Dec. 26, 2002, now Pat. No. 6,858,140.

(51) Int. Cl.
*B01D 29/68* (2006.01)
(52) U.S. Cl. ...................... 210/791; 210/806
(58) Field of Classification Search .............. 210/791, 210/269, 270, 271, 407, 413, 806
See application file for complete search history.

(56) References Cited

U.S. PATENT DOCUMENTS

| | | | | |
|---|---|---|---|---|
| 339,722 A * | 4/1886 | Wiles | ................. | 210/391 |
| 1,359,162 A | 11/1920 | Genter | | |
| 1,483,111 A * | 2/1924 | Price | ................. | 210/346 |
| 1,919,567 A * | 7/1933 | Laughlin et al. | ............ | 210/265 |
| 2,028,466 A * | 1/1936 | Moran | ................. | 210/486 |
| 2,302,449 A * | 11/1942 | Laughlin | ............ | 210/273 |
| 2,342,035 A * | 2/1944 | Clark | ................. | 210/196 |
| 2,351,332 A | 6/1944 | Goodloe | | |
| 2,940,595 A * | 6/1960 | Crane | ................. | 210/333.1 |
| 3,189,181 A * | 6/1965 | Couse | ................. | 210/291 |
| 3,339,742 A * | 9/1967 | Kracklauer | ............ | 210/232 |
| 3,397,141 A * | 8/1968 | Nakai | ................. | 210/637 |
| 3,481,479 A * | 12/1969 | Terhune et al. | ............ | 210/484 |
| 3,559,809 A * | 2/1971 | Barmore | ............ | 210/333.1 |
| 3,623,614 A * | 11/1971 | Schmidt, Jr. | ............ | 210/486 |
| 3,635,343 A * | 1/1972 | Holland | ............ | 210/104 |
| 3,731,814 A | 5/1973 | Walters | | |
| 3,959,148 A * | 5/1976 | Krynski et al. | ............ | 210/334 |

(Continued)

FOREIGN PATENT DOCUMENTS

EP    498037 A1 *   8/1992

(Continued)

OTHER PUBLICATIONS

Photos of system equivalent to that shown schematically in Figs 29, 30 & 31 of U.S. Patent 6,858,140.

*Primary Examiner*—Terry K Cecil
(74) *Attorney, Agent, or Firm*—Niro, Haller & Niro

(57) ABSTRACT

The present invention relates to stationary cloth media filtration systems and devices, as well as processes and devices for uniform flow distribution and improved cloth media filter backwashing.

5 Claims, 21 Drawing Sheets

U.S. PATENT DOCUMENTS

| | | | | |
|---|---|---|---|---|
| 4,090,965 | A | * | 5/1978 | Fuchs .......................... 210/151 |
| 4,107,026 | A | | 8/1978 | Freeman |
| 4,116,838 | A | * | 9/1978 | Lazzarotto ................... 210/209 |
| 4,152,265 | A | * | 5/1979 | Meyers ........................ 210/273 |
| 4,428,838 | A | | 1/1984 | Creps |
| 4,519,903 | A | * | 5/1985 | Johnson ........................ 210/94 |
| 4,540,487 | A | | 9/1985 | Johnson |
| 4,579,656 | A | * | 4/1986 | Johnson ...................... 210/234 |
| 4,639,315 | A | * | 1/1987 | Fuchs et al. ............... 210/333.1 |
| 4,790,935 | A | * | 12/1988 | Johnson ...................... 210/232 |
| 4,859,332 | A | * | 8/1989 | Johnson ...................... 210/332 |
| 4,898,671 | A | * | 2/1990 | Fux et al. ............... 210/333.01 |
| 4,919,805 | A | * | 4/1990 | Johnson ...................... 210/332 |
| 5,035,799 | A | * | 7/1991 | Rosberg et al. ............ 210/232 |
| 5,057,217 | A | * | 10/1991 | Lutz et al. ................... 210/346 |
| 5,268,095 | A | * | 12/1993 | Barzuza ...................... 210/143 |
| 5,362,384 | A | * | 11/1994 | Whetsel ........................ 210/85 |
| 5,374,360 | A | * | 12/1994 | Weis .......................... 210/780 |
| 5,401,405 | A | * | 3/1995 | McDougald ................ 210/273 |
| 5,567,327 | A | | 10/1996 | DeHaan |
| 5,575,910 | A | * | 11/1996 | Karbachsch et al. ... 210/321.75 |
| 5,707,527 | A | * | 1/1998 | Knutson et al. ............. 210/660 |
| 5,876,612 | A | * | 3/1999 | Astrom ....................... 210/741 |
| 6,090,298 | A | * | 7/2000 | Weis .......................... 210/780 |
| 6,103,132 | A | * | 8/2000 | Seyfried et al. ............. 210/791 |
| 6,294,098 | B1 | * | 9/2001 | Bergmann ................... 210/791 |
| 6,679,994 | B1 | * | 1/2004 | Turco et al. ................. 210/767 |
| 6,858,140 | B2 | * | 2/2005 | Smith et al. ................. 210/332 |
| 7,001,507 | B2 | * | 2/2006 | Orozco et al. ............... 210/164 |
| 2004/0124158 | A1 | * | 7/2004 | Smith et al. ................. 210/791 |
| 2004/0245190 | A1 | * | 12/2004 | Baumann et al. ........... 210/791 |
| 2005/0115911 | A1 | * | 6/2005 | Smith et al. ................. 210/791 |
| 2005/0161393 | A1 | * | 7/2005 | Baumann et al. ........... 210/411 |

FOREIGN PATENT DOCUMENTS

| | | |
|---|---|---|
| JP | 55-44359 | 3/1980 |
| WO | WO 9008587 A1 * | 8/1990 |

\* cited by examiner

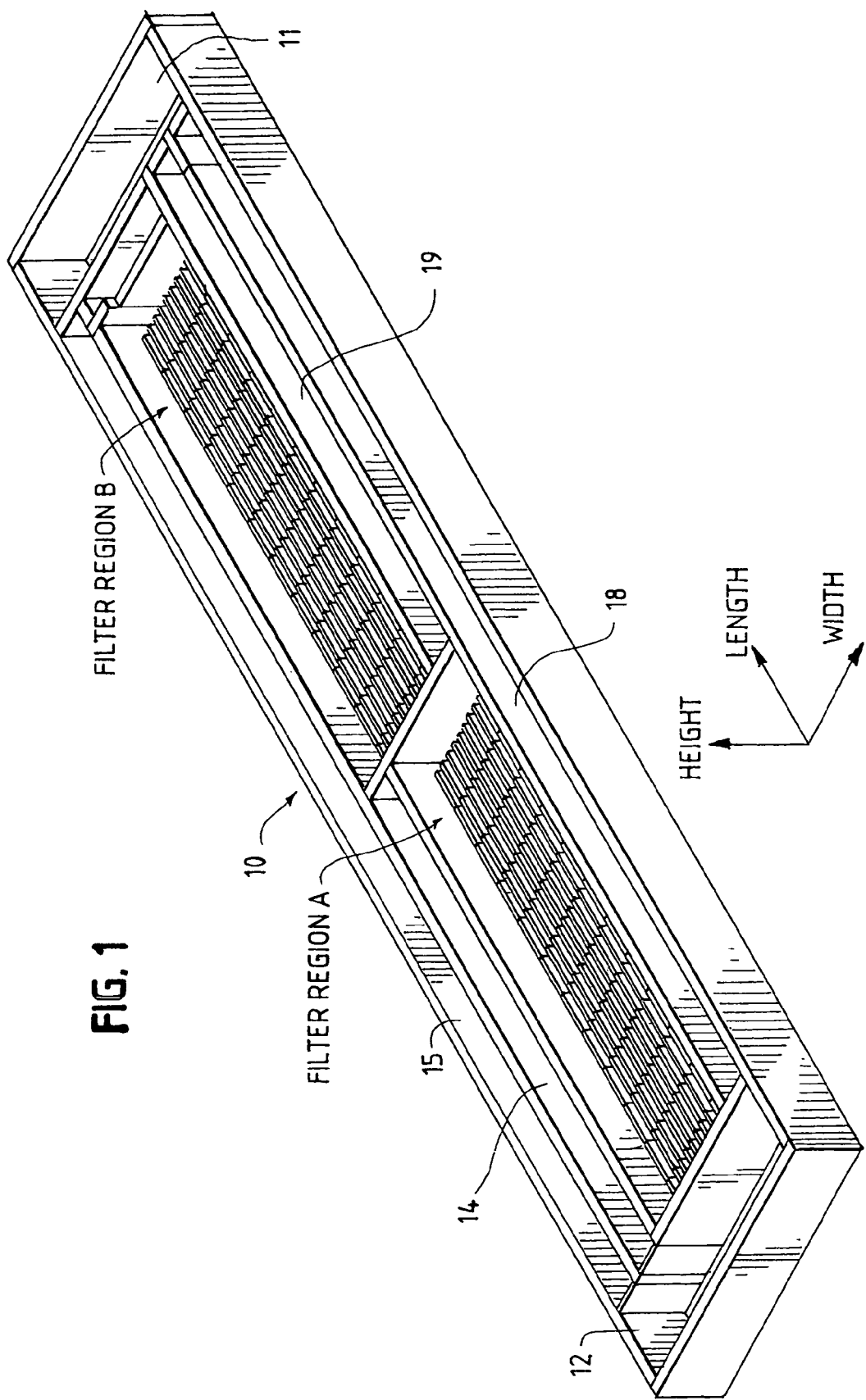

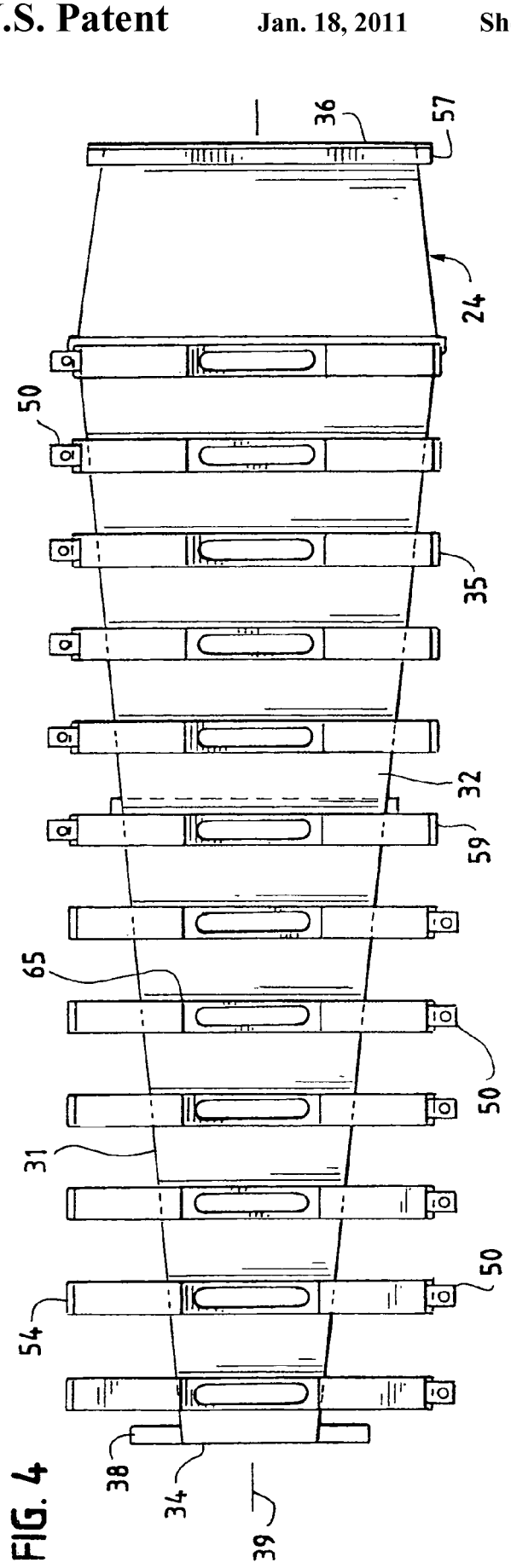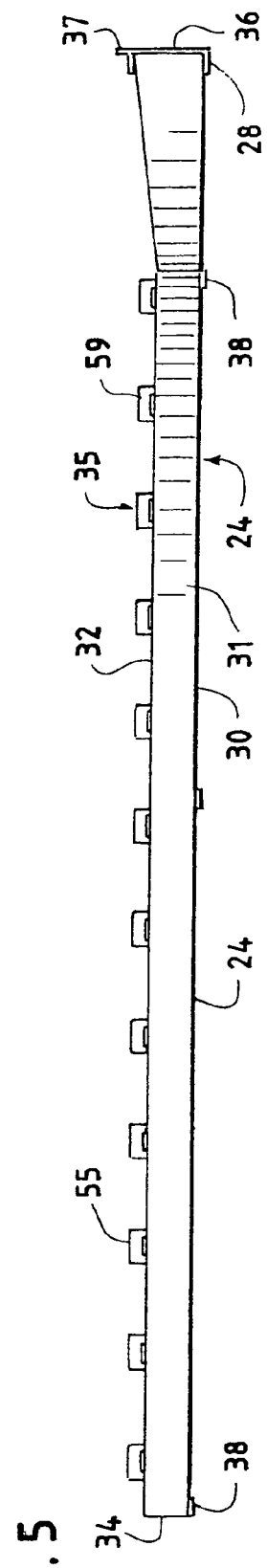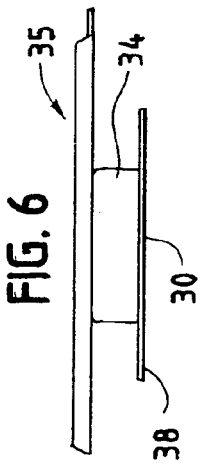

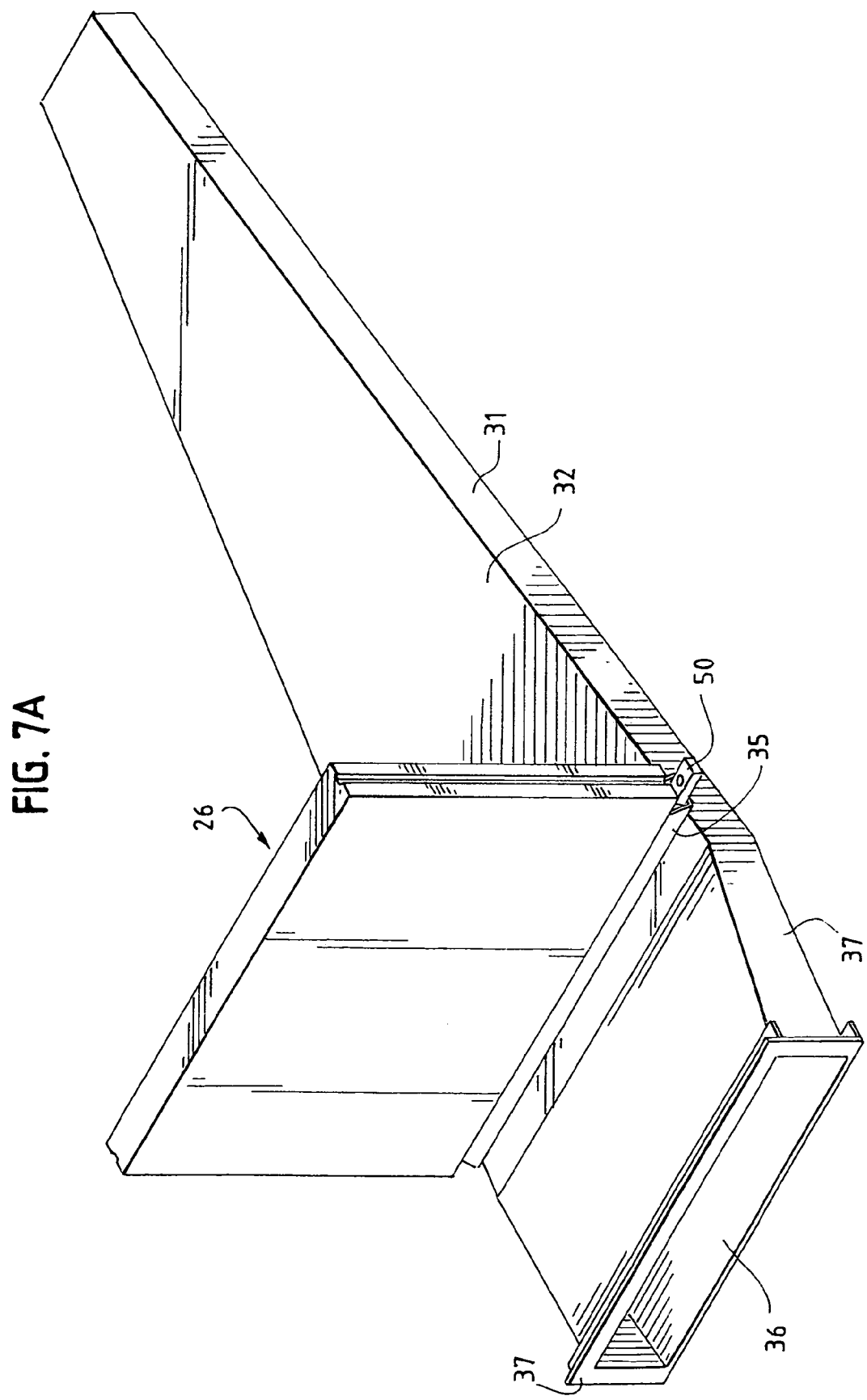

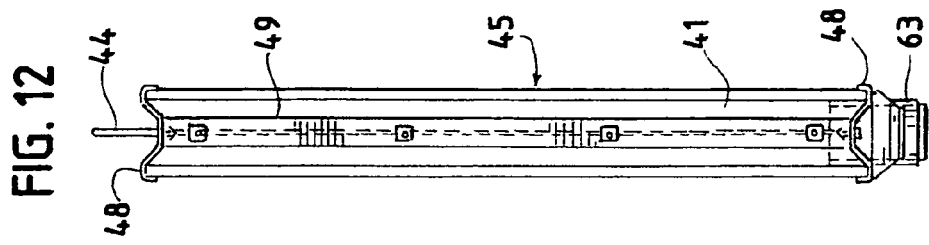
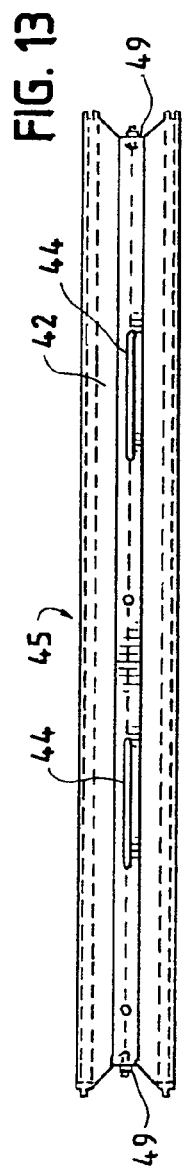
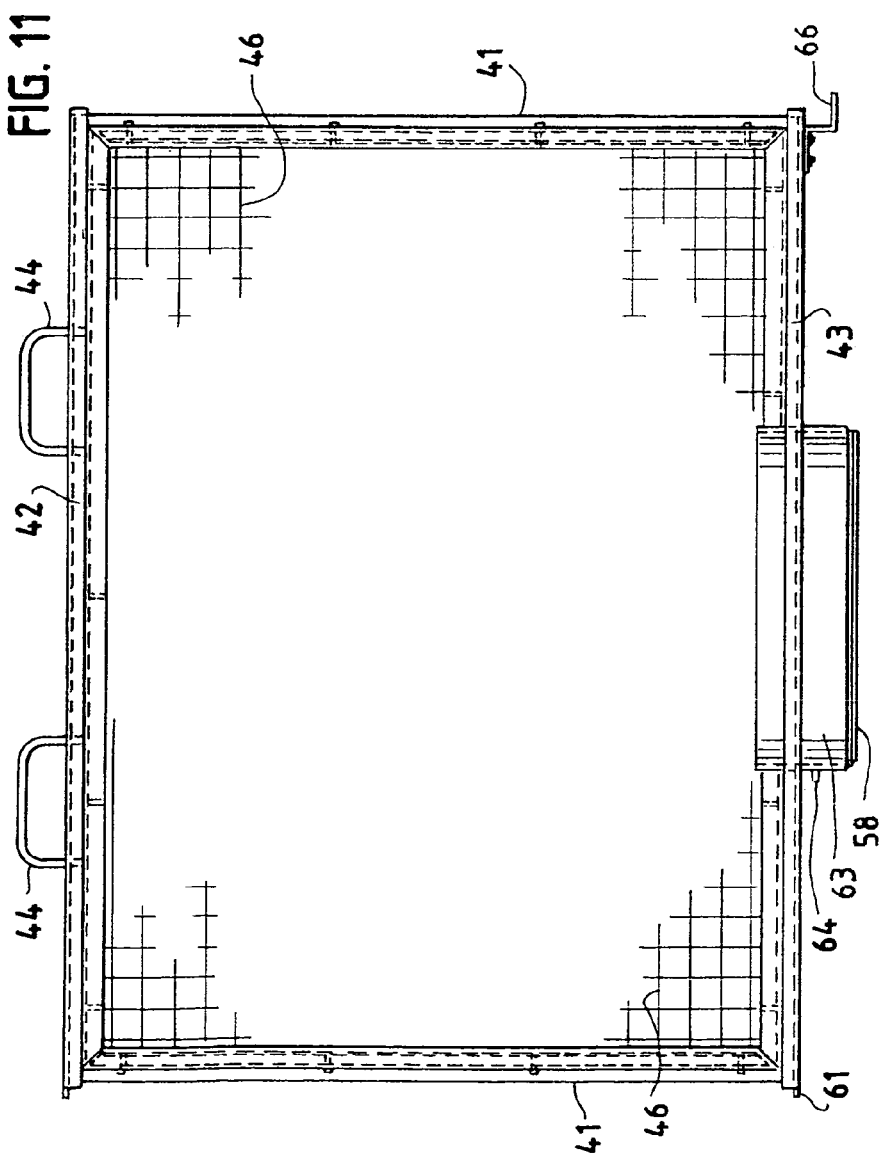

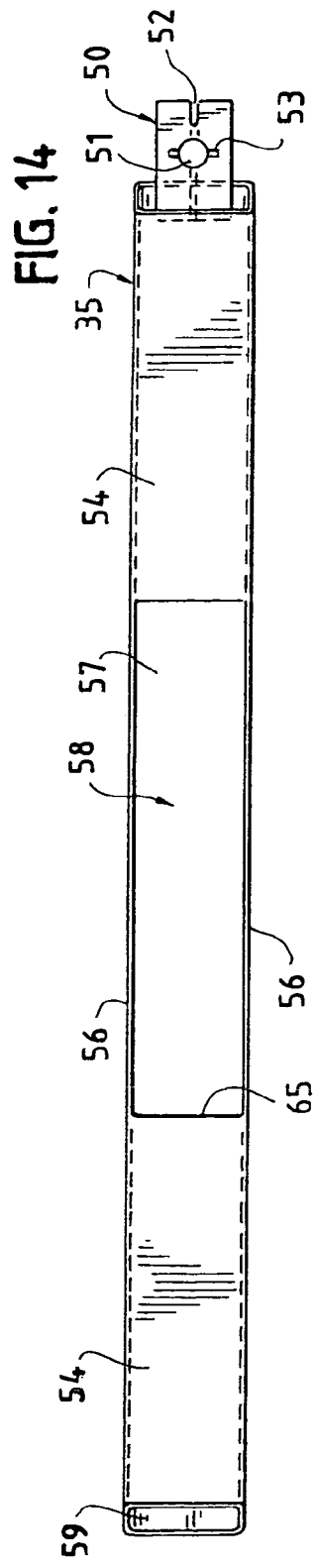
FIG. 14
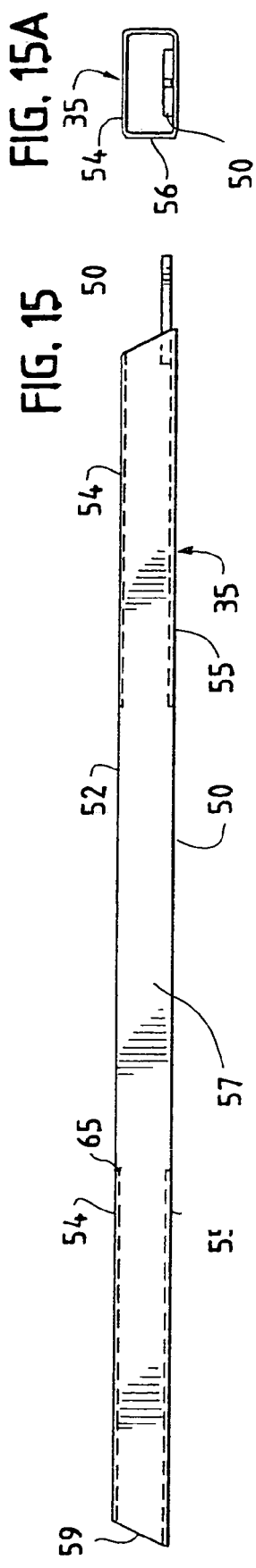
FIG. 15
FIG. 15A
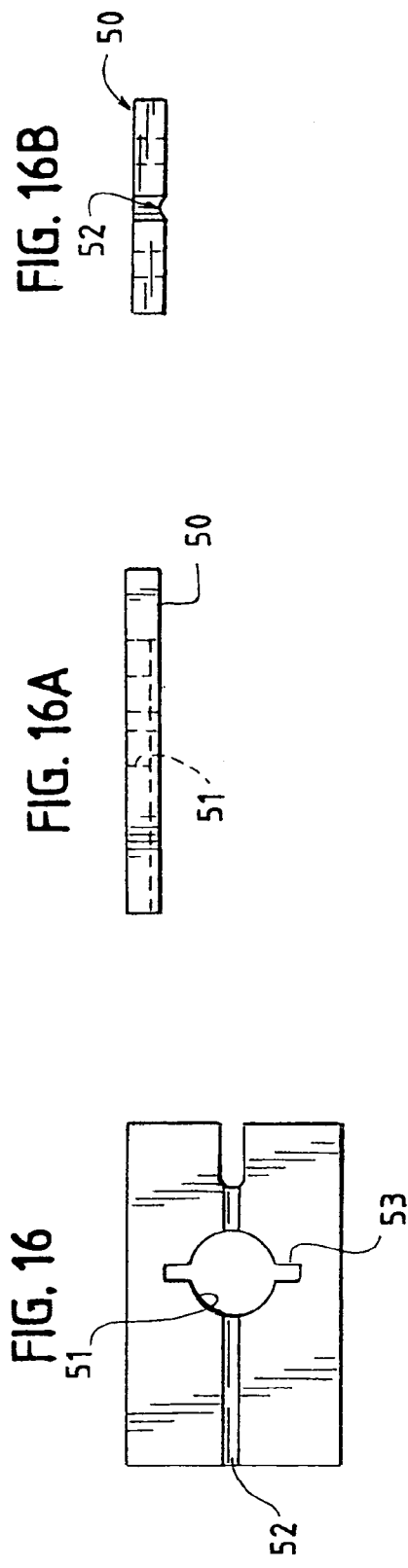
FIG. 16B
FIG. 16A
FIG. 16

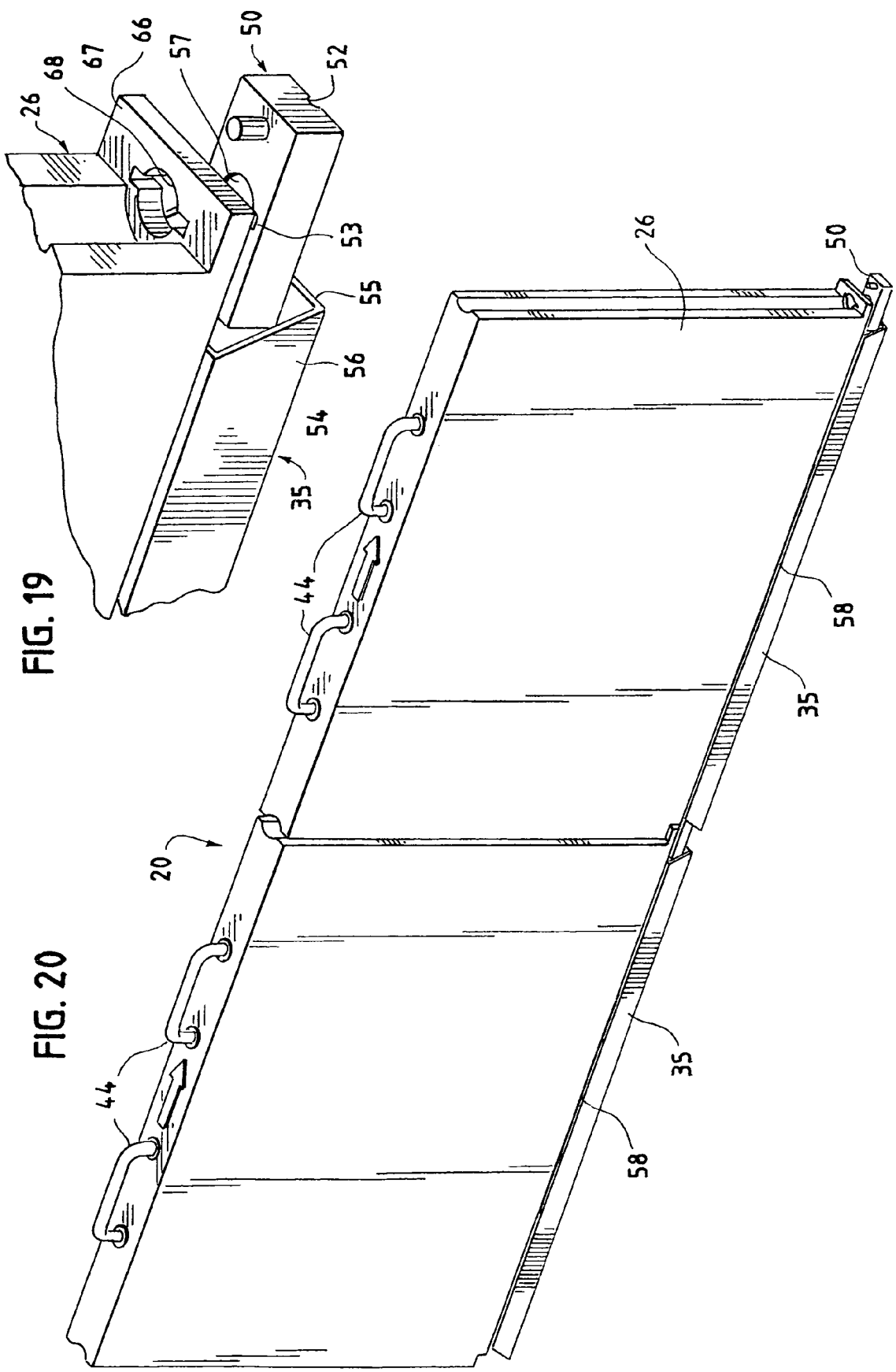

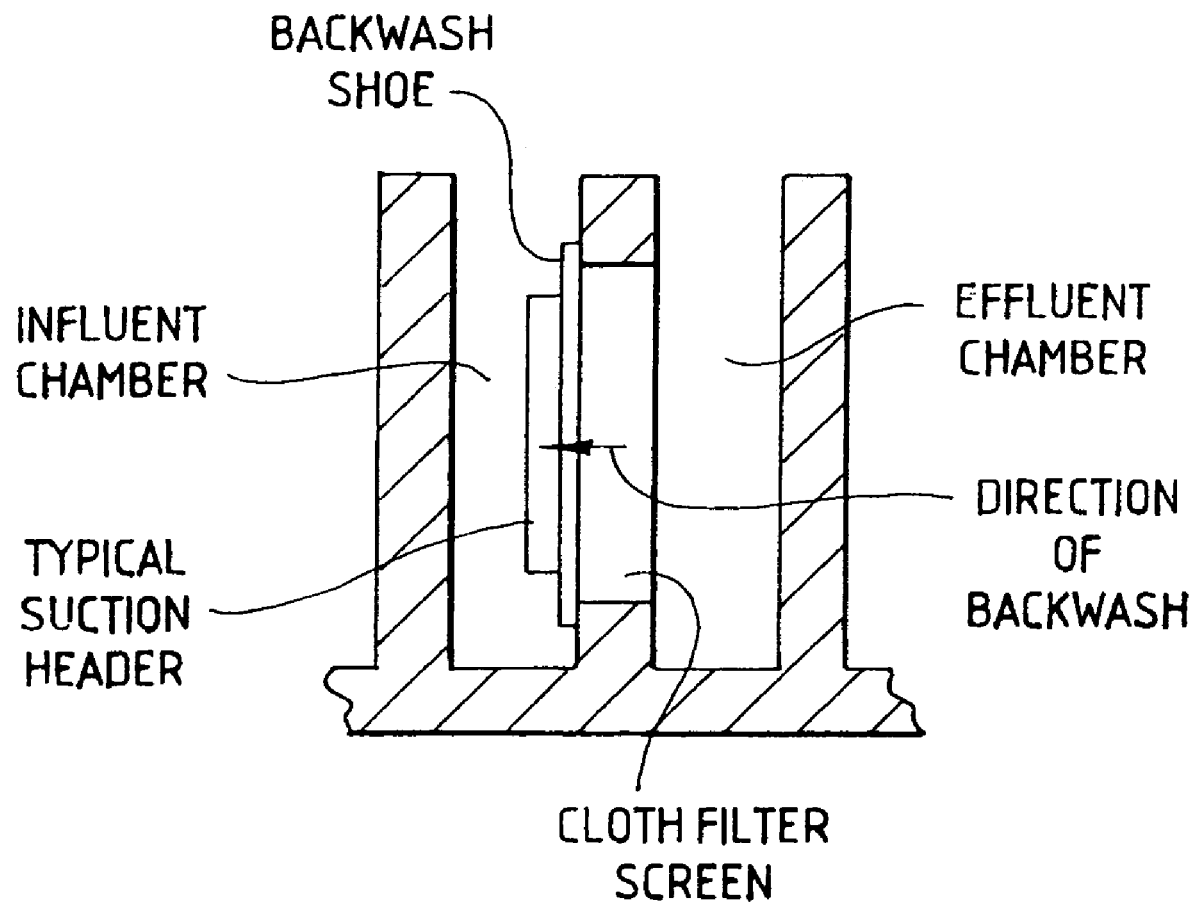

US 7,871,527 B2

PROCESSES FOR WATER AND WASTEWATER TREATMENT, INCLUDING STATIONARY CLOTH MEDIA FILTRATION

This application is a divisional of application Ser. No. 10/329,630 filed on Dec. 26, 2002, which issued as U.S. Pat. No. 6,858,140 on Feb. 22, 2005.

FIELD OF THE INVENTION

The present invention relates generally to water and wastewater treatment processes. More particularly, the present invention relates to stationary cloth media filtration systems and devices, as well as processes and devices for uniform flow distribution and backwashing.

BACKGROUND OF THE INVENTION

There are a variety of established water and wastewater treatment systems. One type that has been in use for decades, in one form or another, is granular media gravity filtration. Granular media gravity filters, such as conventional deep bed sand filters, are used to strain out particles from a wastewater stream. Typically, wastewater is introduced into a sand filtration region from an influent chamber through inlet ports. The influent flows by gravity through the granular media filter, such as sand contained by a porous plate, to an effluent chamber. The granular media filter bed, which is typically divided into a series of adjacent cells, is then periodically cleaned using a variety of backwash procedures. See, for example, U.S. Pat. No. 4,152,265.

Another well known type of water and wastewater filtration is rotating cloth media filtration, often referred to as disk or drum filtration. In general, disk or drum filtration systems include a tank having an inlet and outlet and a rotatable filter frame positioned between the inlet and outlet. Cloth filter media is stretched over large drums or disk-type frame sections of the rotatable filter frame. During filtering, influent flows into the tank and passes through the cloth filter media, depositing the suspended solids on the filter media. The filtered effluent is then discharged from the tank outlet. See, for example, U.S. Pat. Nos. 4,090,965 and 4,639,315. The cloth filter media is periodically cleaned by a variety of procedures, including backwashing and/or high pressure sprays. See, for example, U.S. Pat. Nos. 5,374,360, 5,876,612 and 6,090,298.

In the early 1970's, a stationary cloth media filtration system was attempted in Europe. As shown schematically in FIG. 29, it is believed that this system included a filtration basin with a series of rectangular effluent chambers, each effluent chamber sandwiched between a pair of rectangular influent chambers. The vertical walls between influent chambers and the effluent chamber had a series of openings or windows across which cloth media screens were attached (FIG. 30). In operation, the wastewater to be treated was introduced into the influent chambers through subsurface gates. The influent was filtered by passing the flow through the screened windows of the filtration walls into the effluent chamber. From there, the filtered effluent flowed through subsurface gates to be discharged. The screens of this system were periodically cleaned by backwashing, which was accomplished by pulling a backwash header vertically up against the cloth filter media, using a submerged chain and sprocket arrangement.

This attempt at stationary cloth media filtration suffered from a number of problems. For example, if one of the filter screens failed, that whole section of the filtration system would have to be shut down, i.e., 2 influent chambers and associated effluent chamber. In addition, because of their design, the seals around the filtration screens were prone to leaks or failure, resulting in poor quality effluent. Similarly, since most of the moving parts, such as the chain and sprocket system needed for backwashing, were submerged, the chambers had to be dewatered before maintenance could be conducted. In short, this attempt at a cloth filtration system was very complicated and inefficient. It is believed that the system was a failure and was abandoned. As a result, the industry moved in the direction of rotating cloth media filtration methods, as generally described above.

Rotating cloth media filtration systems require that the cloth filter media be subject to periodic cleaning, such as by backwashing and/or high pressure spray. Typical backwashing includes a suction header and backwash shoe assembly which is pressed directly against and pulled along the cloth filter media surface. In operation, a vacuum is applied to the suction header, pulling fluid through the cloth filter media and the backwash shoe in a direction opposite the flow direction during filtering (see FIG. 31). This reverse flow removes much of the accumulated solids caught in and blocking the cloth filter media. Typically, the suction header and shoe press directly against the cloth filter media (including the area where the cloth media is pulled against the frame assembly) in the conventional backwash arrangement (even when backwashing is not being conducted), which may put the cloth filter media under a preload. This may result in increased wear and premature break-through of the cloth filter media.

Conventional rotating cloth media filtration also has some inherent limitations. For example, the filtration area is limited by the size of the disks/drums and/or tanks. Larger disks/drums require deeper and larger tanks, increasing their construction costs. The retrofit or construction of smaller tanks requires smaller disks, which reduces the filtration surface area.

Regardless of the type of filtration media used, uneven flow distribution over the volume of the filtration basin or region is a potential problem. For example, uneven or non-uniform flow distribution within the filtration basin or region often results in sludge settling, particularly in areas of low turbulence. This often results in the need for additional sludge removal equipment or increased system down time. In addition, non-uniform flow velocity across the filter may also result in increased sludge settling.

Thus, while the conventional deep bed sand and rotating disk filtration systems generally described above have been widely and successfully used in a variety of applications, each of these systems suffer from drawbacks inherent in or related to their size, design and/or application.

SUMMARY OF THE INVENTION

The present inventions preserve the advantages of known water and wastewater treatment filtration systems and devices and provide new features, advantages and benefits over these systems. In addition, the present inventions preserve the advantages of known systems and devices that may be used and/or are associated with these systems and provide new features, advantages and benefits.

For example, the present inventions provide higher quality effluent (even at high solids and hydraulic loading rates), lower backwash rates and higher capacity for a given basin footprint, when compared to conventional sand filters. They also eliminate sand or other granular media, making backwashing faster and more efficient. When compared to rotating disk-type or drum-type cloth media filtration systems, the present inventions provide, among other things, higher capacity while maintaining a comparably high quality effluent, continuous filtration during the backwash cycle and the elimination of the necessity for rotary disks and drums and their associated hardware. The present invention also provides more uniform flow distribution in the basin and over the filtration media, regardless of the type of filtration media used. The present inventions also improve the backwashing operation and reduce wear and break-through of cloth filter media for a variety of types of cloth media filtration.

In addition, the present inventions provide for effective stationary cloth media filtration, using unique filter plates that overcome the disadvantages of the previously attempted stationary cloth media filtration. Uniform flow distribution and decreased sludge settling, as well as improved backwashing procedures, are also provided.

In a preferred embodiment of the present invention, a stationary cloth media filtration system for treating a flow of water or wastewater in a filtration basin is provided which includes at least one influent plenum having metering slots to distribute the influent flow across the bottom of the filter basin; at least one effluent plenum sealed from the influent plenum to discharge filtered flow from the system; a filtration region having a series of filter plates which are in fluid communication with the effluent plenums; and, a backwash assembly to periodically clean the filter plates. Preferred embodiments may also include generally trapezoidally shaped, influent and effluent plenums that are complementary to one another and located along the bottom of the filter basin. Moreover, filter plates may be fastened directly to the plenums.

Also in a preferred embodiment of the present invention, a method of treating water or wastewater in a filtration basin using filter plates is provided. The method includes providing an influent flow of water or wastewater to be treated to an influent channel and uniformly distributing the influent flow along the length of the bottom of the filter basin; distributing the influent flow uniformly across the width of the bottom of the filter basin; filtering the influent flow with the filter plates; discharging the filtered effluent with a relatively constant flow velocity and reduced head loss; and, periodically cleaning the filter plates with suction.

The present inventions also provide a system for providing uniform flow distribution for filtering a water or wastewater influent flow in a filtration region with at least one trapezoidally shaped influent plenum with orifices to distribute the influent flow into the filtration region, and at least one trapezoidally shaped effluent plenum having orifices to receive the filtered effluent flow.

Another preferred embodiment of the present invention provides an improved backwash system for backwashing cloth filter media attached to a frame. This system includes a backwash header, a backwash shoe and a means to create a gap between the backwash shoe and the cloth filter media.

Accordingly, it is an object of the present invention to provide processes and devices for stationary cloth media filtration;

Another object of the present invention is to provide processes and devices for stationary cloth media filtration that may be retrofit into existing filtration basins or designed for new installations;

An additional object of the present invention is to provide processes and devices for stationary cloth media filtration that provide the capability of continuous filtration during backwashing;

A further object of the present invention is to provide processes and devices for stationary cloth media filtration with high quality effluent and the maintenance of high quality effluent at high solids and high hydraulic loading rates;

Still another object of the present invention is to provide processes and devices for stationary cloth media water and wastewater filtration that eliminate the need for traditional granular media;

Still an additional object of the present invention is to provide processes and devices for stationary cloth media filtration that may provide cost advantages over traditional granular media filtration, including but not limited to, reduced site footprint requirements, resulting in less land use, decreased concrete costs, as well as reduced enclosure costs in colder climates, and/or reduced operational, maintenance and manufacturing costs, such as the ability to change components above the water, easy replacement of cloth media filter membranes and the like;

Still a further object of the present invention is to provide processes and devices for the uniform fluid flow distribution into and/or over the volume of a filtration region or filtration basin;

Still an additional object of the present invention is to provide processes and devices for the maintenance of consistent flow velocity in a filtration region or filtration basin;

Yet an additional object of the present invention is the uniform distribution of flow in a filtration basin or filtration region;

Yet another object of the present invention is to provide processes and devices for distributing and/or collecting flow in a filtration region or basin having increased turbulence at the lower portion of the filtration region or filtration basin and/or reduced amounts of sludge settlement or other solids and/or a reduced need for dedicated sludge removal equipment;

Yet a further object of the present invention is to provide processes and devices that effectuate uniform flow distribution over the filtration region or basin using a combination of influent and effluent channeling to control flow and distribution;

Still yet another object of the present invention is to provide processes and devices for improved backwashing of cloth filter media;

Still yet an additional object of the present invention is to provide processes and devices for cloth filtration media backwashing without a preload on the cloth filter media;

Still yet a further object of the present invention is to provide processes and devices for cloth filter media backwashing, including a stop to position the suction header and shoe away from the cloth filter media;

Still yet a further object of the present invention is to provide processes and devices for backwashing cloth filter media that extend cloth filter media life by decreased wear rate; and, Still yet a further object of the present invention is to provide water and wastewater filtration systems and devices that include one or more of the above stated objects, features or advantages, alone or in combination.

DEFINITION OF THE TERMS

The following terms which may be used in the various claims of this patent are intended to have their broadest meaning consistent with the requirements of law:

Cloth filter media: Any permeable cloth-like material, including but not limited to natural or synthetic fiber or membrane compositions.

Filtration basin: The overall area devoted to the filtration process, which may typically be divided into various filtration regions, and which may have associated chambers, channels and the like.

Filtration region: The area or areas in a filtration basin where water and wastewater filtering is conducted, for example, by using stationary cloth filter media in accordance with the present inventions.

Filter plate(s): The cloth media filter frame assembly, including at least the side, top and bottom frame members, and associated cloth filter media. It may optionally include other components as well and the term may often be used interchangeably with filter frame assembly herein.

Traveling bridge assembly: The structural and mechanical assembly typically located above the filtration basin that carries the components necessary to conduct the backwash and other operations and which is able to traverse the effective length or portion of the filtration region or filtration basin.

Where alternative meanings are possible, in either the specification or claims, the broadest meaning is intended. All words used in the claims are intended to be used in the normal, customary usage of grammar and the English language.

BRIEF DESCRIPTION OF THE DRAWINGS

The above described objects, features and advantages, as well as other features and advantages of the present inventions will become apparent by reference to the specification and drawings; wherein like reference numbers are used for like elements among the several views, and in which:

FIG. 1 is a side perspective view of a typical configuration of a filtration basin of the present invention having an exemplary two filtration regions;

FIG. 4 is a top plan view of a preferred embodiment of an effluent plenum and associated filter frame support mounts of the present invention;

FIG. 5 is a side plan view of the preferred effluent plenum and filter frame support mounts of FIG. 4;

FIG. 6 is an end plan view of the effluent plenum and associated filter frame support mounts of FIGS. 4 and 5, showing the closed end of a preferred effluent plenum;

FIG. 6A is an end plan view of the effluent plenum of FIGS. 4 and 5, showing the influent or open end of a preferred effluent plenum;

FIG. 7A is a perspective view of a preferred and an associated filter frame support mount, including a schematic view of a filter plate engaged with the filter frame support mount;

FIG. 11 is a front plan view of a typical filter frame assembly and associated hardware of the present invention;

FIG. 12 is a side plan view of a typical filter frame assembly and associated hardware of FIG. 11;

FIG. 13 is a top plan view of the filter frame assembly and associated hardware of FIG. 11;

FIG. 14 is a top view of a filter frame support mount and a filter frame pin retaining plate of the present invention;

FIG. 15 is a side view of the filter frame support mount of FIG. 14;

FIG. 15A is an end view of the filter frame support mount and filter frame retaining plate of FIG. 15;

FIG. 16 is a top view of a preferred pin retaining plate of FIG. 14;

FIG. 16A is a side view of a preferred pin retaining plate of FIG. 16;

FIG. 16B is an end side view of a preferred pin retaining plate of FIG. 16;

FIG. 19 is a perspective view of the orientation of the pin retaining plate of the filter frame support arm and a pin retaining bracket on the filter frame assembly;

FIG. 20 is a perspective view of two adjacent filter frame assemblies showing their alignment with two adjacent and corresponding filter frame support mounts;

FIG. 31 is a schematic side view of a typical prior art suction header and shoe for backwashing cloth filter media showing direct contact between the suction header and cloth filter media.

DETAILED DESCRIPTION OF PREFERRED EMBODIMENTS

Set forth below is a description of what is currently believed to be the preferred embodiments or best representative examples of the inventions claimed. Future and present alternatives and modifications to the preferred embodiments are contemplated. Any alternatives or modifications which make insubstantial changes in function, purpose, structure, use or result are intended to be covered by the claims of this patent.

Figure 1A:
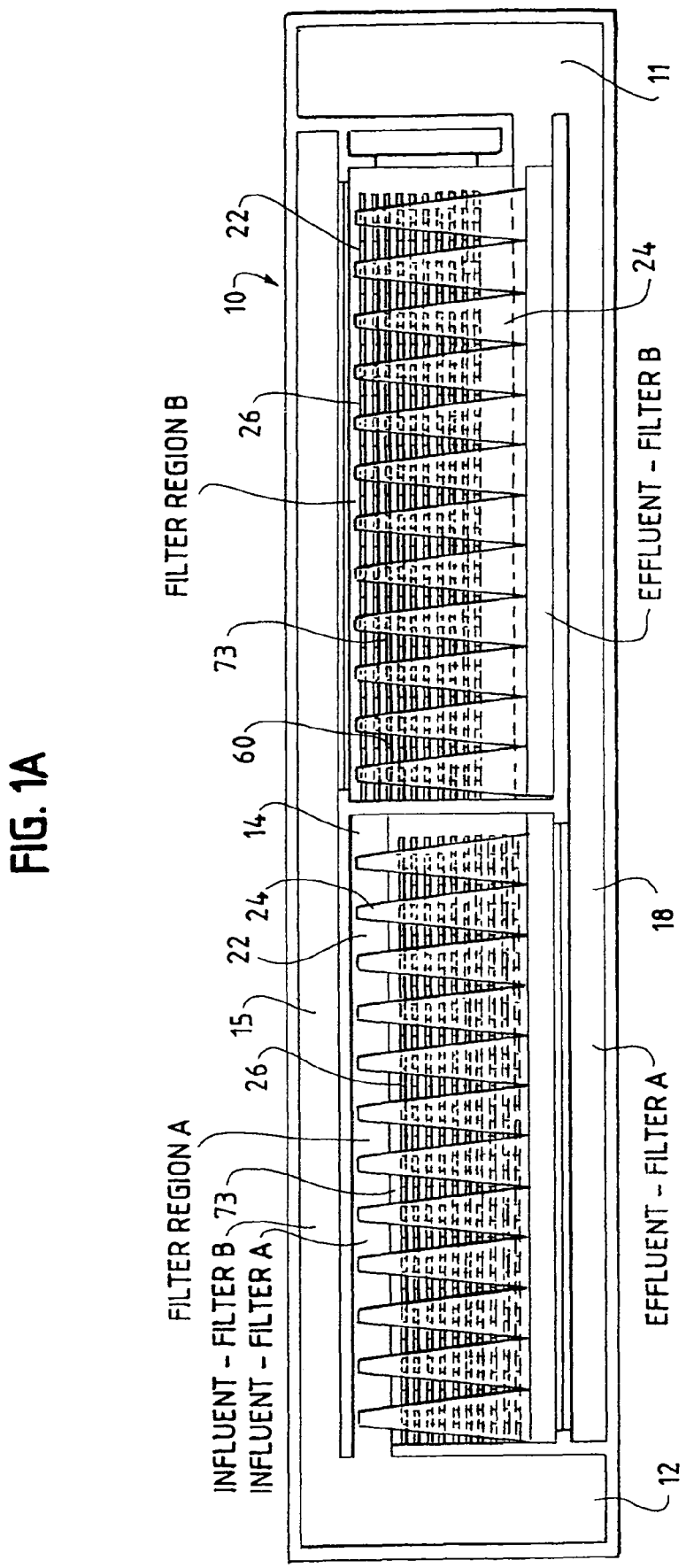
FIG. 1A is a top plan view of the typical arrangement of the filtration basin of FIG. 1 of the present invention.
Figure 1B:
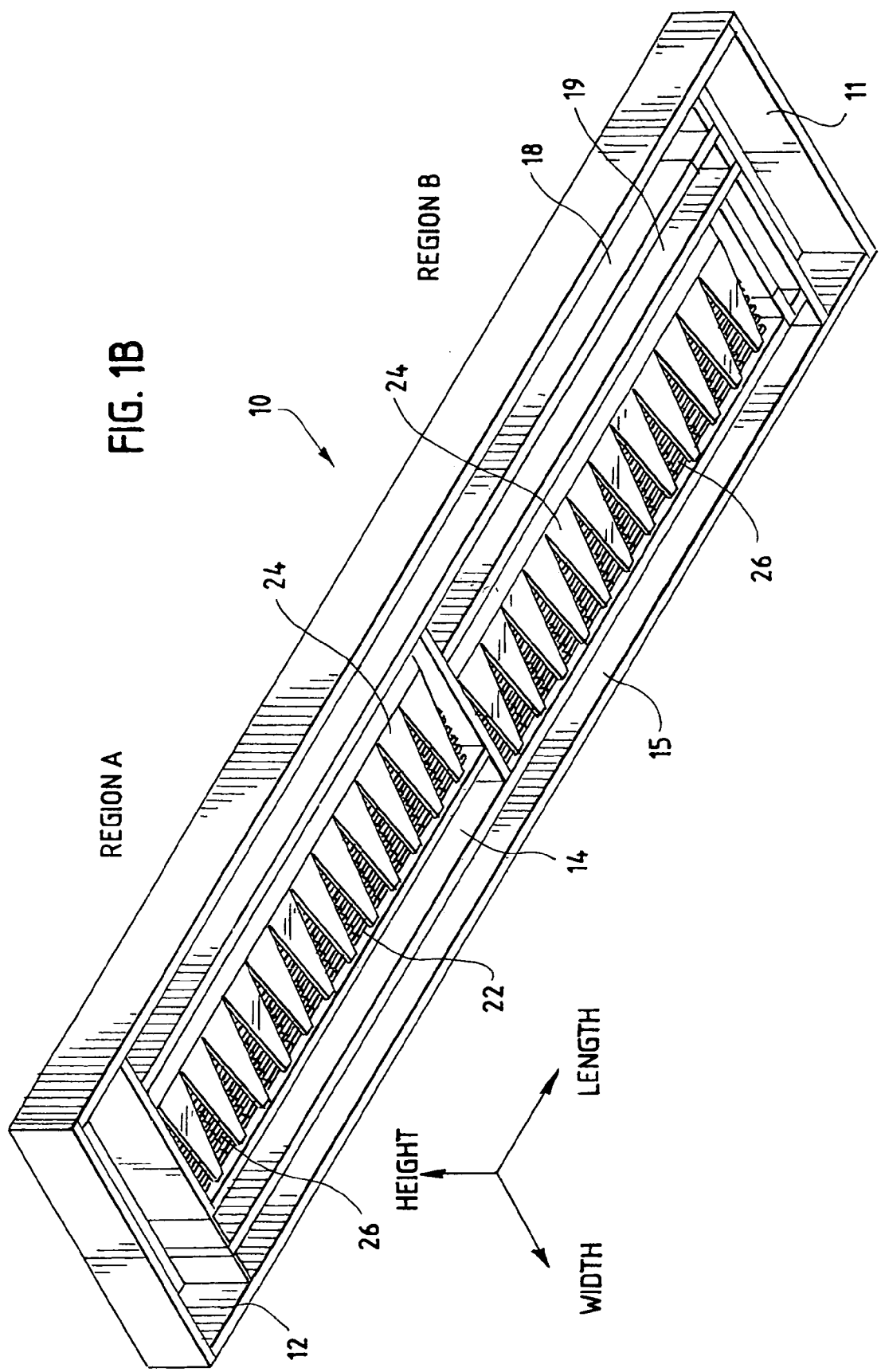
FIG. 1B is a bottom perspective view looking from below the typical configuration of the present invention of FIG. 1.

The general layout of a typical configuration of one embodiment of the present invention may be seen by reference to FIGS. 1 and 1A. The present invention may be designed to fit into the footprint of an existing filtration basin to replace, for example, a granular media gravity filtration system. It may also be designed for a completely new facility, or installed in a tank arrangement similar to conventional disk filtration. Moreover, many aspects of the present invention may be applicable to other water and wastewater treatment methods.

The present invention includes a filtration basin 10, divided into a variety of channels, chambers, regions and the like, the walls creating each of which are typically constructed of concrete or other suitable material, such as steel or stainless steel, particularly in a tank setting. In the example shown in FIGS. 1 and 1A, filtration basin 10 is divided into two cloth media filtration regions A and B. Cloth media filtration regions A and B are, in all aspects pertinent to the present inventions, identical in structure and operation. It will be understood by those of ordinary skill in the art that one (basin), two or any number of filtration regions may be provided depending upon the requirements of the particular application. For example, to create additional cloth media filter regions, a diversion of the influent into each of the desired regions and collection of the treated effluent out of each of the filter regions will be required.

Figure 2:
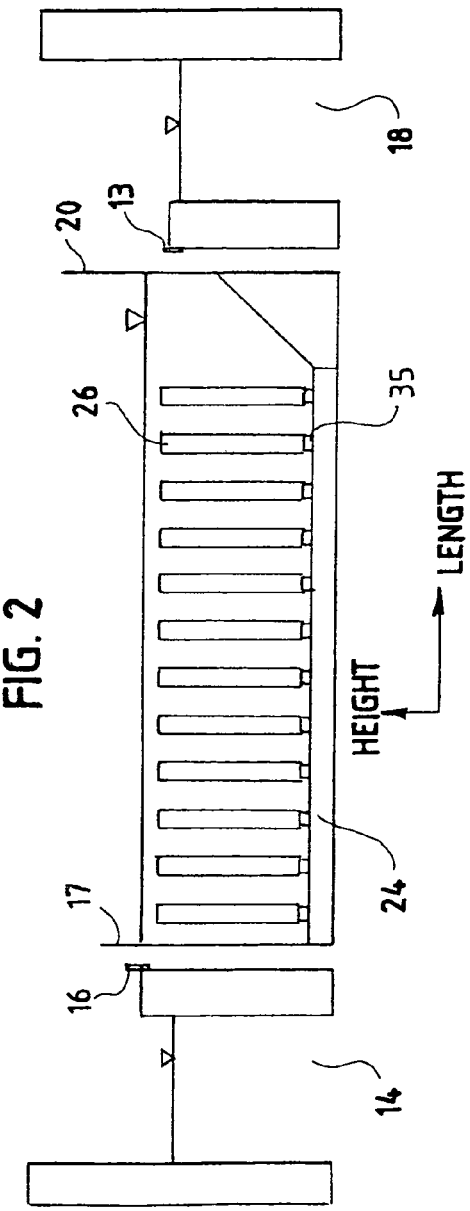
FIG. 2 is a side cross-sectional schematic view of a typical arrangement of a filtration region of a filtration basin of the present invention having an effluent baffle as a way to control water elevation in the system.
Figure 2A:
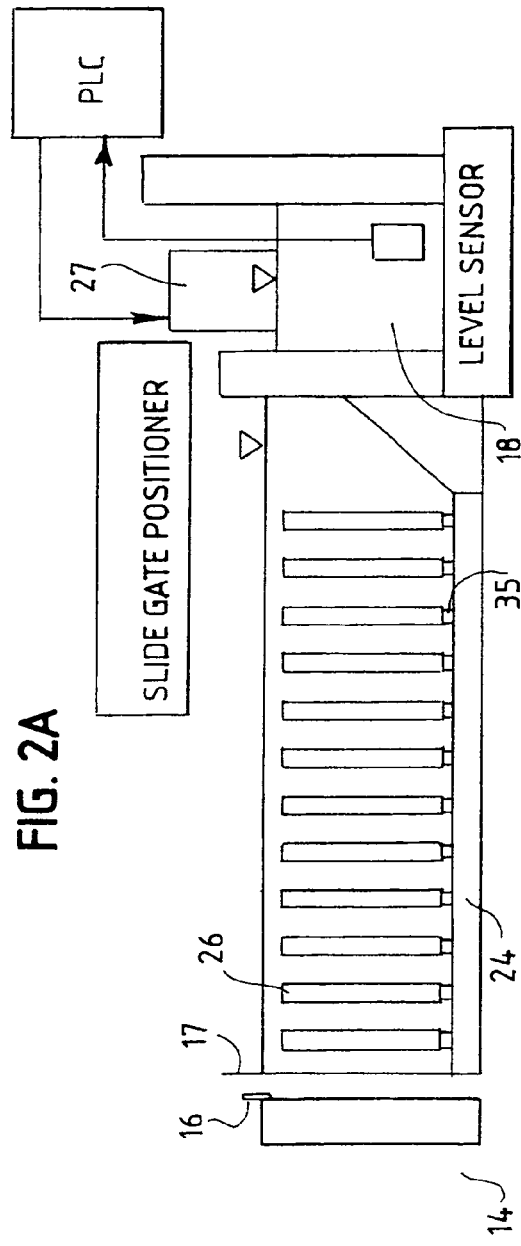
FIG. 2A is a side cross-sectional schematic view of a typical arrangement of a filtration region in a filtration basin of the present invention having an effluent slide gate as an alternative way to control water elevation in the system.
Figure 3:
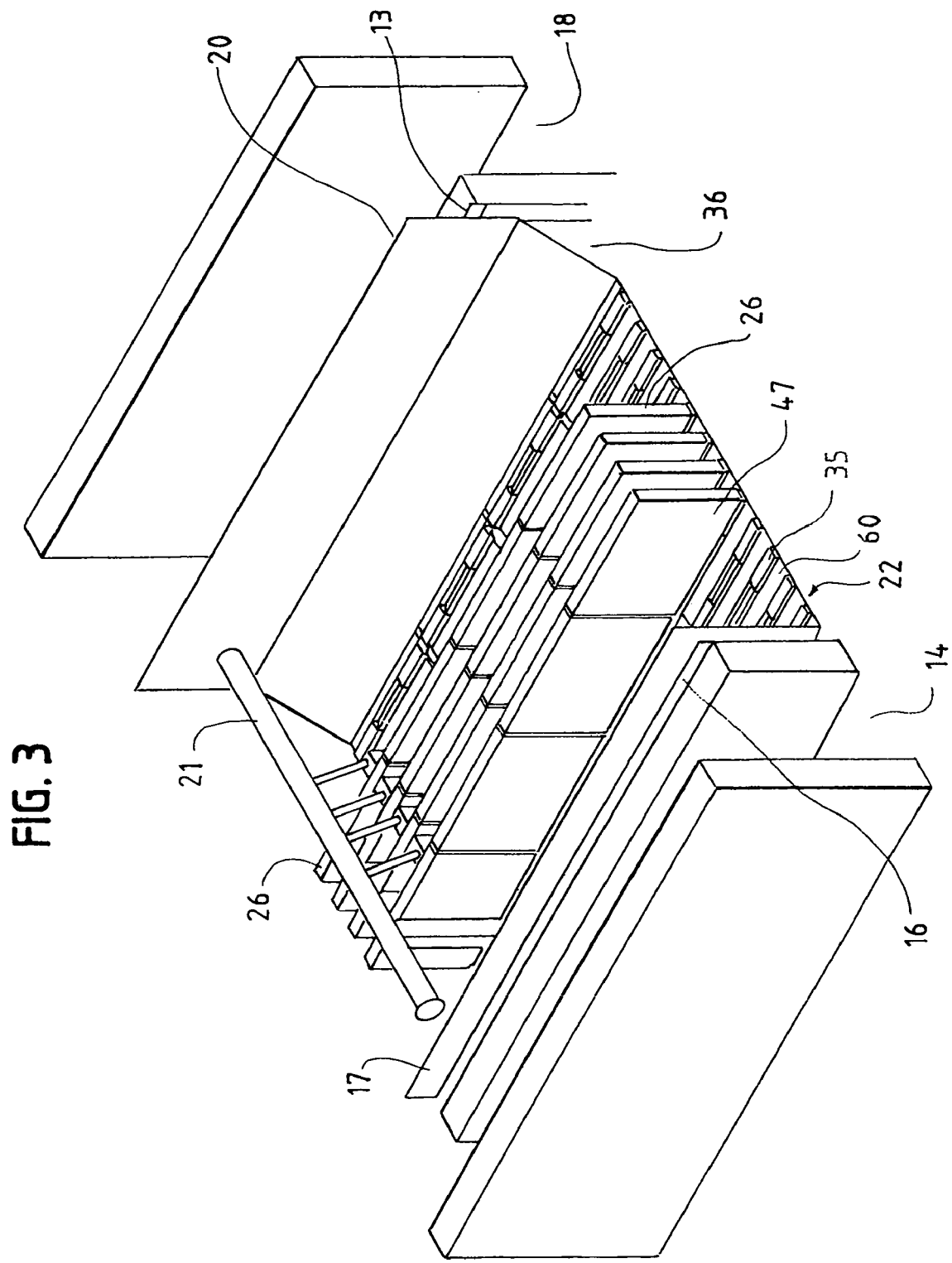
FIG. 3 is a perspective view of portions of the filtration region of the present invention showing the major overall components thereof.

In a preferred embodiment, and particularly the retrofit of an existing basin, the filtration basin 10 includes a bulk influent chamber 12 that receives the initial flow of water or wastewater to be treated. An influent channel 14 which feeds filtration region A, and an influent channel 15 which feeds filtration region B, are also provided. Influent channels 14 and 15 are responsible for conveying the influent from the upstream process via the bulk influent chamber 12 and distributing the influent along the entire length of a cloth media filtration region. An influent weir 16 (see e.g., FIGS. 2 and 3) may be provided along the length of each of the influent channels 14 and 15 to enable the control, adjustment and distribution of flow along the length of each of the filter regions. In addition, an influent baffle 17 (see e.g., FIGS. 2, 2A and 3) is provided along the length of a filter region to direct the influent flow to the bottom of the filter region for uniform flow distribution and filtration using stationary cloth media as hereinafter described. It will be understood by those of skill in the art that influent channels 14/15 may have a manual or an automatic slide gate(s) (not shown) to permit, among other things, water level control and filter isolation.

The filtration basin 10 also includes an effluent channel 18 that receives treated water or wastewater from filter region A, effluent channel 19 that receives treated wastewater from filter region B, and a bulk effluent chamber 11 that receives the treated effluent from effluent channels 18 and 19; Prior to the treated effluent reaching effluent channels 18 and 19, the effluent may be subject to an effluent baffle 20 and an effluent weir 13, both of which help control and distribute the flow as dictated by the requirement of a particular application. The effluent is then transferred to bulk effluent chamber 11 for discharge. In lieu of effluent baffle 20, an automatically controlled slide gate 27 and its associated components (not shown) may be positioned at the end of effluent channel 18/19 which is used to control the water level in and flow through the system (see FIG. 2A). When the system is used in this configuration, the effluent plenums 24 flow directly to the effluent channels 18/19. It will be understood by those of skill in the art that a wide variety of methods and devices may be used to control the system flow consistent with the present inventions.

The remainder of the discussion of the present inventions and preferred embodiments thereof that relate to stationary cloth filter media filtration will be by reference to a single cloth media filtration region, such as filter region A. The primary components that are part of or associated with a particular filtration region of the present invention may be seen by reference to FIGS. 1B and 3, and include: an influent channel 14, influent plenums 22, effluent plenums 24, filter frame assemblies 26, also referred to as filter plates 26, an effluent channel 18 and a backwash system assembly 21, which is part of a traveling bridge assembly 23.

The structure and operation of influent plenums 22 and effluent plenums 24 may be understood by reference to FIGS. 4 through 10. The preferred embodiments of the effluent 24 and influent 22 plenums are shown and described, although other forms may be utilized consistent with the present invention. It is the combination of plenums 22/24 and their equivalents that provide uniform distribution of the influent flow across the filtration region, regardless of whether filtration is conducted according to the stationary cloth media filtration aspects of the present invention or other types of filtration systems. In its preferred form, uniform flow distribution is achieved by the influent and effluent channeling, which may include the control and distribution of flow from a single source and which is collected through a single source.

Figure 7:
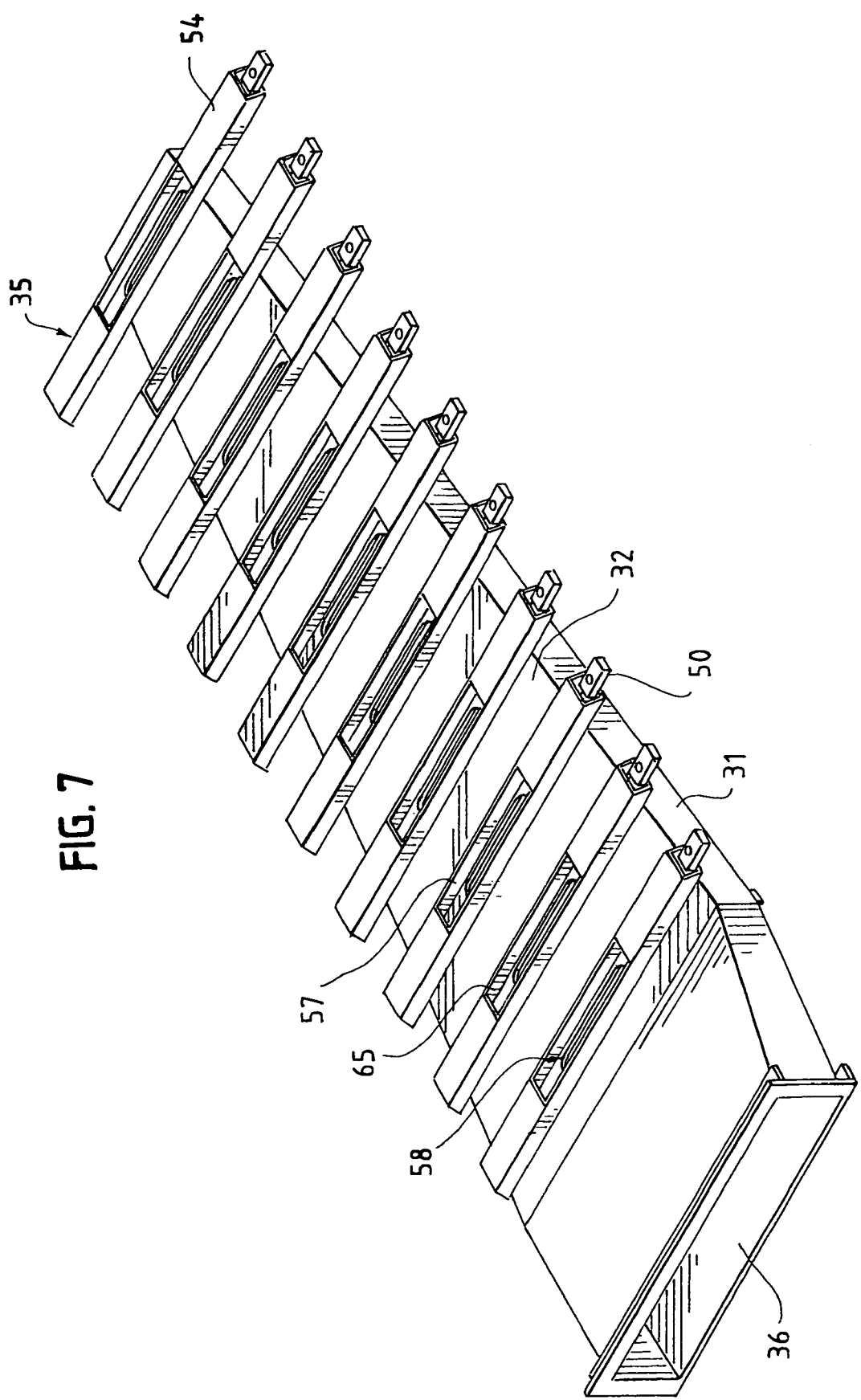
FIG. 7 is a perspective view of a preferred effluent plenum and an alternative arrangement of the associated filter frame support mounts of the present invention, also showing the effluent end of a preferred effluent plenum.

More specifically, in the preferred embodiments, each effluent plenum 24 is a generally trapezoidal shaped chamber that is sealed from the unfiltered influent flow and preferably constructed from a non-corrosive material, including but not limited to stainless steel. Each effluent plenum 24 includes a solid bottom plate 30, two solid side plates 31 (only one is shown in FIGS. 5, 6 and 7), and a top plate 32. Top plate 32 is provided with a series of oblong holes 33 that receive the filtered flow as hereinafter described. Aligned with each of the holes 33 is a filter frame support mount 35. Filter frame support mount 35 is affixed to the top of plate 32 of the effluent plenum 24 and functions to mount the filter frame assembly 26 to the effluent plenums 24, as well as helping to strengthen the structural integrity of the effluent plenums 24. As shown, for example, in FIG. 4, filter frame support mount 35 as well as the longitudinal axis of the oblong holes 33 are aligned perpendicular to the longitudinal axis of the effluent plenum 24. The filter plates 26 are then vertically mounted thereto as shown generally in FIGS. 7 and 8.

The preferred effluent plenums 24 have a closed end 34 and an open end 36, the open end 36 forming the effluent end of effluent plenum 24. Closed end 34, as well as bottom 30 and open end 36, are also provided with a flange 38 or other means to facilitate attachment and alignment of effluent plenum 24 to the bottom and/or side structure of the filtration region. Effluent plenum 24 is provided with an effluent flange 37, also to facilitate attachment of the effluent plenums 24 to the bottom and/or side structure of the filtration region. The effluent plenums 24 are arranged side-by-side in columns along the width of the bottom of the filtration region (see FIGS. 1A and 8-10). Specifically, in a preferred embodiment of the present invention, the longitudinal axis of effluent plenums 24 are aligned with the width of the cloth media filtration region and their length coincides with the width of the region (see e.g., FIGS. 1A and 3). The open or effluent ends 36 are adjacent to and are in fluid communication with the effluent channel 18 and the closed ends 34 are typically adjacent to the influent channel 14, where the influent baffle 17 or other means directs the influent to the bottom or lower portion of the system. As a result, the filter plates 26 are aligned in rows spanning the length of the filtration region which, as discussed herein, enables efficient backwashing and the like using a traveling bridge assembly 23.

The influent plenums 22 are also trapezoidally shaped chambers that are complementary to and formed by the side-by-side effluent plenums 24. As shown in the drawings (see e.g., FIGS. 9 and 10), in a preferred form, influent plenums 22 are tapered channels formed from the pathway created between the sides 31 of effluent plenums 24, the bottom of the influent plenums 22 being preferably formed from the bottom of the cloth media filtration region or filtration basin (not shown). Influent plenum tops 73 may also be provided (see FIGS. 1A and 8-10) and which tops 73 form metering slots 60 as hereinafter described. The influent plenum tops 73 may be formed by a plate extending co-planar to the top surface 32 of the effluent plenum 24. It will be understood that the influent plenums 22 may be formed from separate components like the effluent plenums 24. However, this is not required, since only the effluent plenums 24 must be impervious to unfiltered flow. Similar to the formation of the influent plenums 22 from the side-by-side arrangement of the effluent plenums 24 along the bottom of the cloth media filtration region, a series of metering slots 60 are formed in the influent plenum top 73 along the upper portion of the influent plenums 22 as a result of the alignment and spacing of the plates 73 which form the top of influent plenums 22 and metering slots 60.

With reference to FIGS. 6-8 and 14-15A, in a preferred embodiment of the present invention, filter frame support mount 35 is a tubular, generally rectangular member. A pin retaining plate 50 extends laterally outward from one end and may be attached to filter frame support mount 35 by welding or other well known means. Pin retaining plate 50 includes a key slot 51 which is bored or cut through plate 50. The underside of pin retaining plate 50 is provided with a longitudinal pin lock groove 52. Pin lock groove 52 is perpendicular to a key way 53 of key slot 51. The end 59 of filter frame support mount 35 opposite to the pin retaining plate end 50 remains open in a preferred embodiment. These elements function to mount the filter plate 26 to the effluent plenums 24.

The top 54 and bottom 55 surfaces in the central portion of filter frame support mount 35 are removed or cut away (or filter frame support mount 35 is simply assembled leaving an upwardly open sleeve 57), leaving only side surfaces 56. As indicated, this forms an upwardly facing open sleeve 57. Open sleeve 57 is slightly larger than the oblong hole 33 on the top plate 32 of effluent plenums 24, and is centered on filter frame support mount 35 so that it aligns with elongated hole 33 of effluent plenum 24 when the support mount 35 is welded or otherwise attached to the top plate 32 of effluent plenums 24. When attached to the effluent plenums 24 as described, the open sleeve 57 of filter frame support mount 35 forms a filter plate/effluent plenum interface shown generally as 58 (see FIG. 4). This interface 58 may be fitted with gaskets or seals to keep the influent from entering the effluent plenum 24 prior to filtration.

Figure 17:
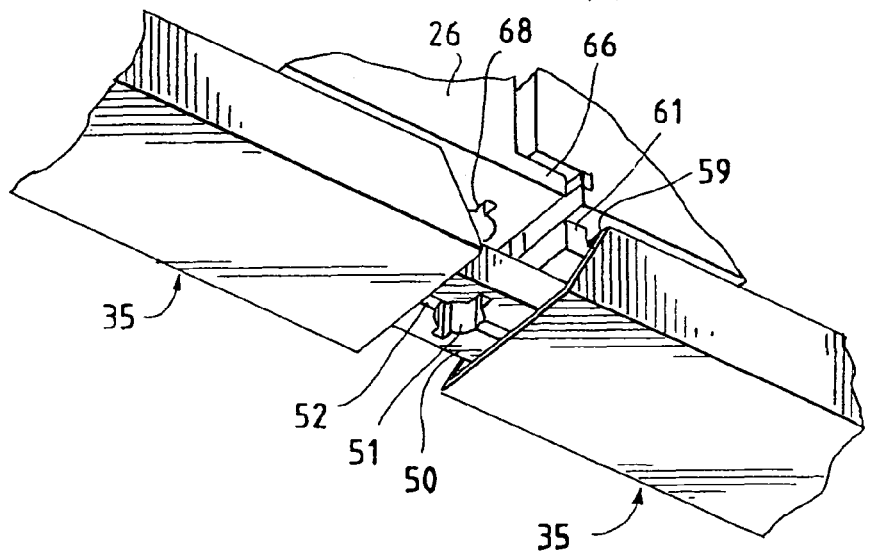
FIG. 17 is a bottom perspective view of two mating filter frame support mounts on adjacent effluent plenums, showing the open end of the filter frame support mount for receiving a portion of the pin retaining plate, and also showing components of a preferred pin retaining bracket of the present invention
Figure 18A:
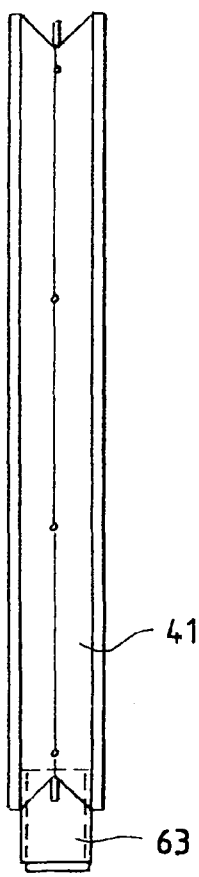
FIG. 18A is a side view of the filter frame assembly and a preferred interface between the filter frame and effluent plenum of FIG. 18.

As indicated, the end of filter frame support mount 35 opposite the end with the pin retaining plate 50 remains open 59. In this manner, when the effluent plenums 24 are arranged longitudinally along the width of the bottom of the filtration region, a portion of pin retaining plate 50 of one effluent plenum 24 is received within the opening of the corresponding filter frame support mount 35 of the adjacent effluent plenum 24 (see FIGS. 17 and 19).

Moreover, as shown in FIG. 4, pin retaining plate 50 may be located on alternate sides of the filter frame support mount 35. Specifically, in a preferred embodiment, half of the adjacent filter frame support mounts 35 may have the pin retaining plate 50 on one side and the remaining half of the filter frame support mounts 35 may have the pin retaining plate 50 on the other side. Similarly, the filter frame support mounts 35 on the adjacent effluent plenum 24 will have their pin retaining plate 50 on the opposite sides, so that the open ends 59 of filter frame support mount 35 mates with pin retaining plate 50 as described above (see e.g., FIGS. 4 and 9).

Figure 8:
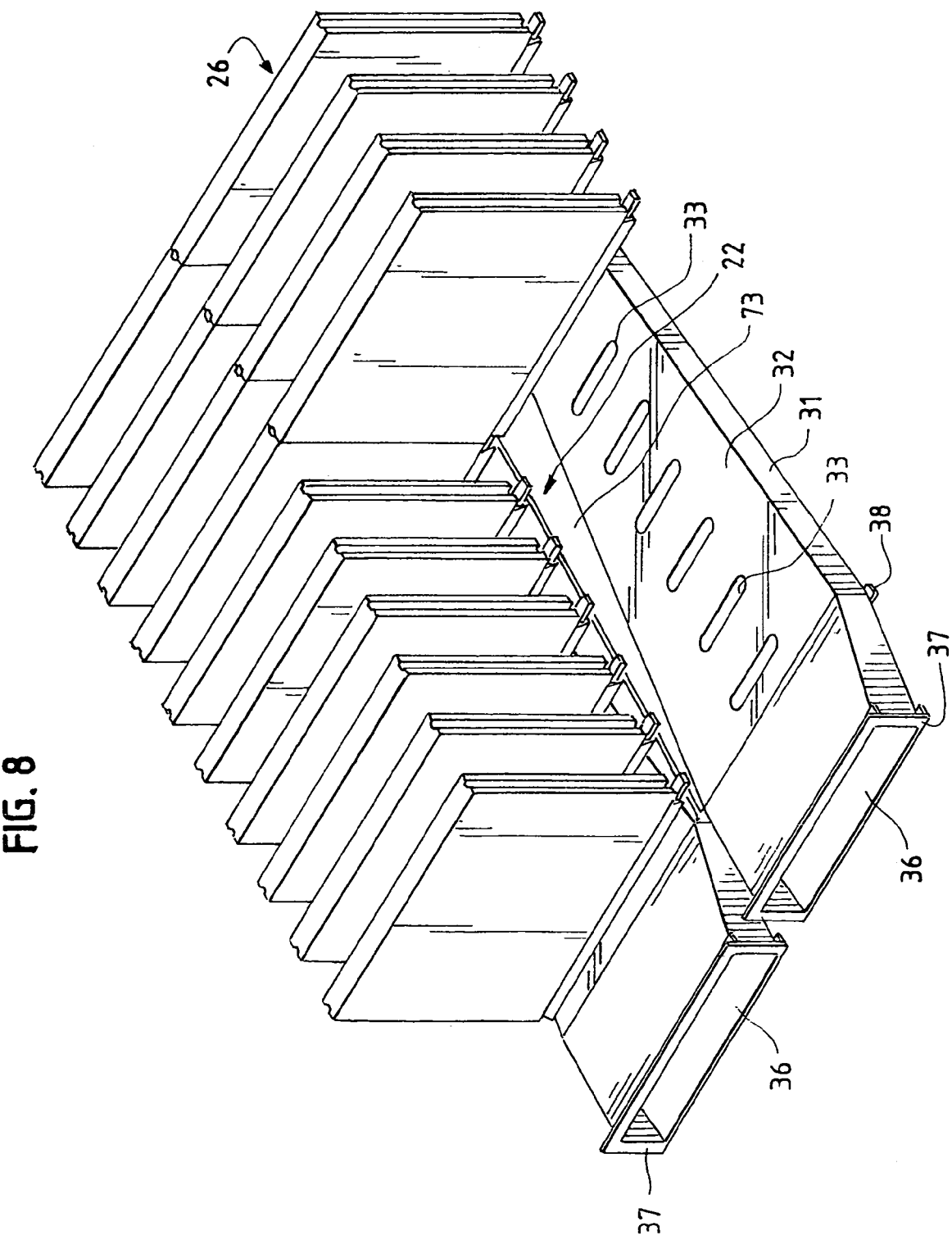
FIG. 8 is a perspective view of a preferred effluent plenum and an alternative arrangement of the associated filter frame support mounts of the present invention showing the effluent end of a preferred effluent plenum, the alternative arrangement of filter frame mounts on the effluent plenum and including schematic view of several of the filter frames engaged with their associated filter frame supports.
Figure 9:
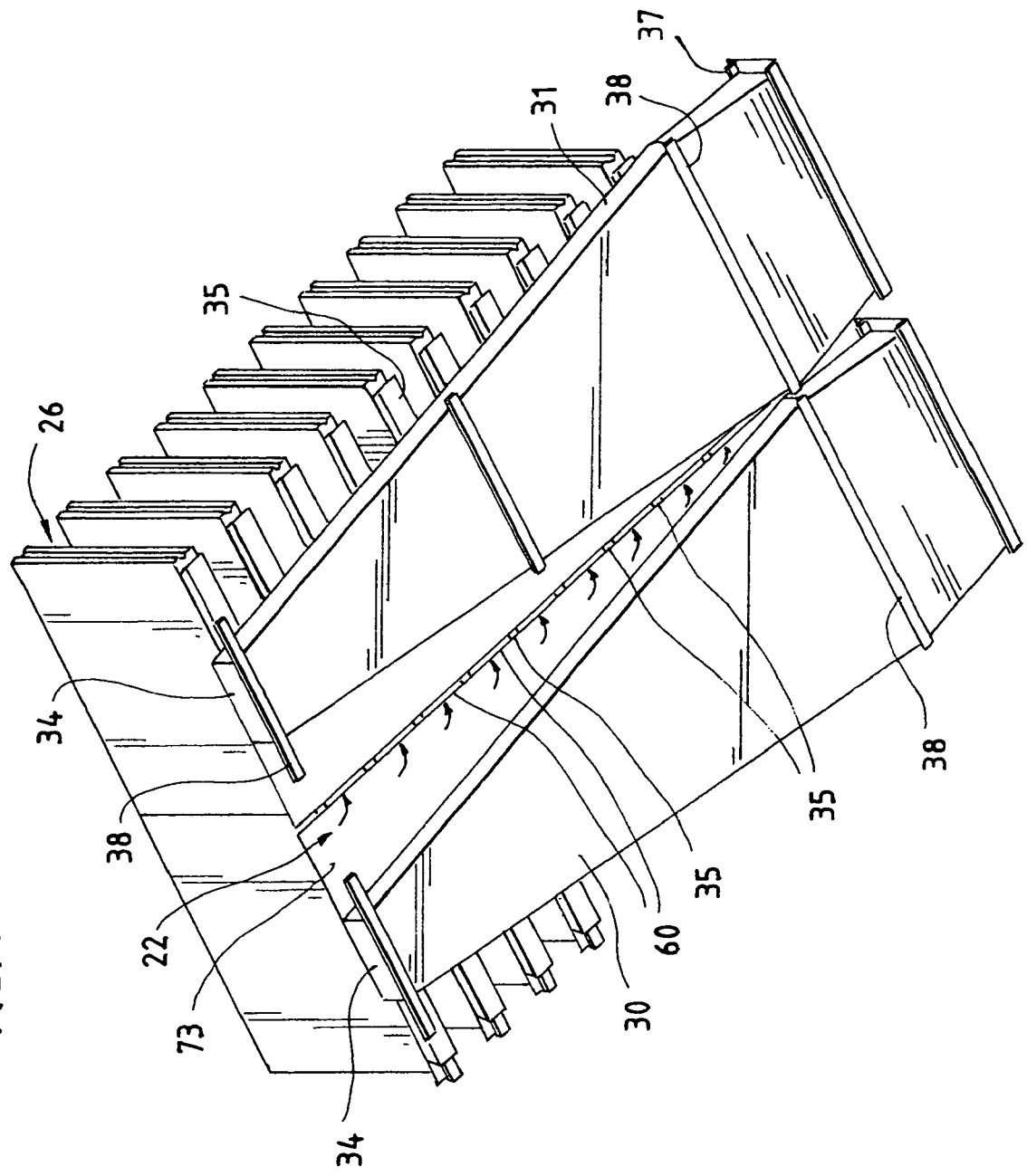
FIG. 9 is a bottom perspective view of a pair of adjacent effluent plenums looking up from below the representative plenums and showing an influent plenum of the present invention formed from the complimentary exterior of the adjacent effluent plenums.
Figure 10:
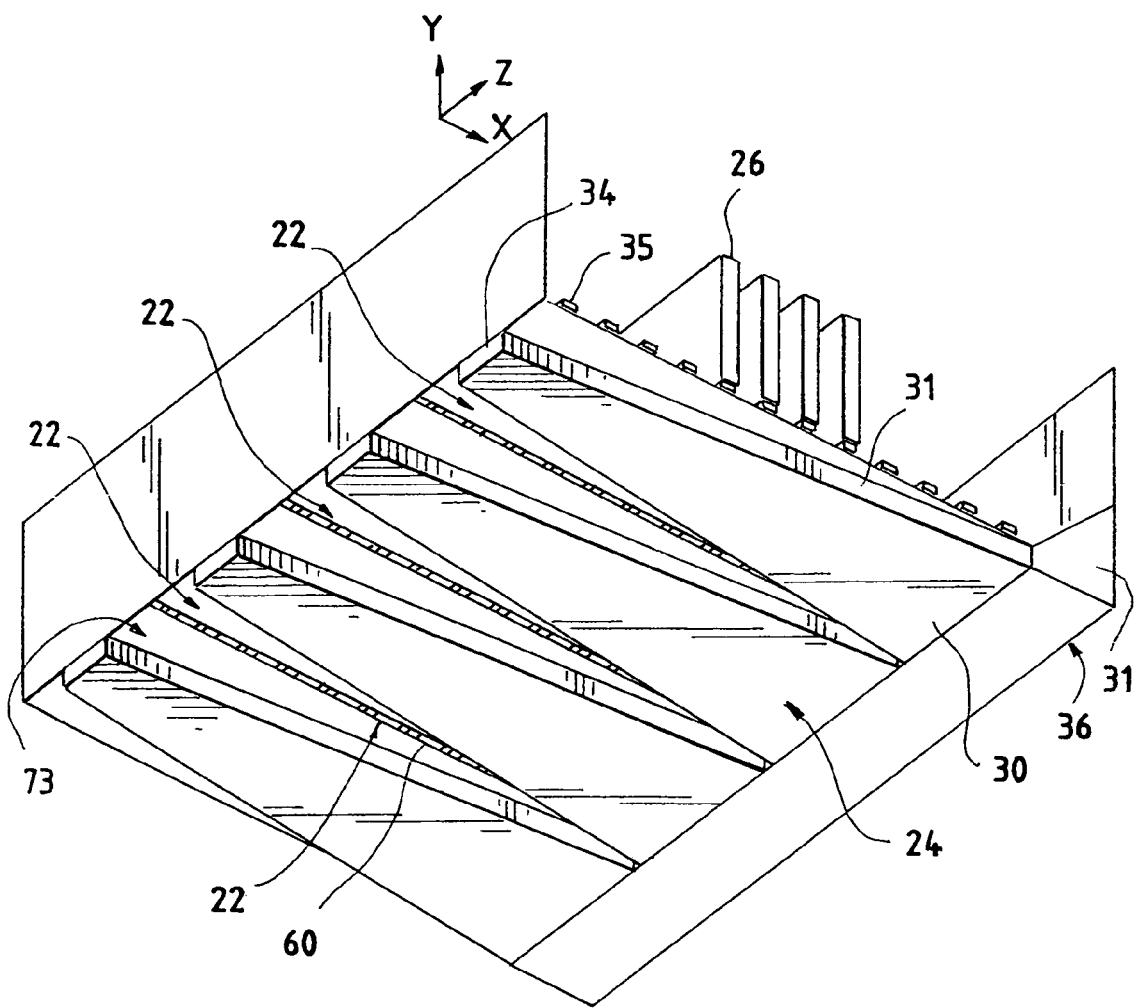
FIG. 10 is a bottom perspective view of additional adjacent effluent plenums of the present invention showing influent plenums formed from the complimentary exterior of the adjacent effluent plenums.

As referred to above, the openings or metering slots 60 of the influent plenums 22 are formed from the influent plenum tops 73, as best shown in FIGS. 8, 9 and 10. In this manner, and in conjunction with the taper shape of the influent plenums 22, influent exiting through the metering slots 60 is uniformly distributed within and across the width of the filtration region via the influent baffle 17 and influent plenum 22. Moreover, because of the taper of the trapezoidal influent plenums 22, even flow velocity is maintained and there is no tendency for solids to settle on the influent plenum 22 bottom.

Figure 26:
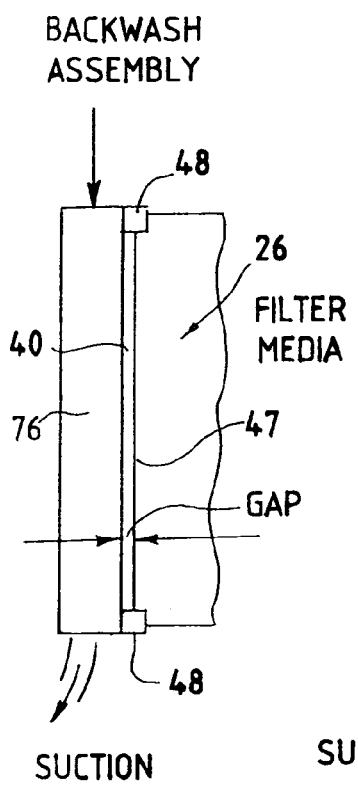
FIG. 26 is a side plan view of a backwash system of the present invention applied to a filter frame assembly, including cloth filter media, of the present invention.
Figure 27:
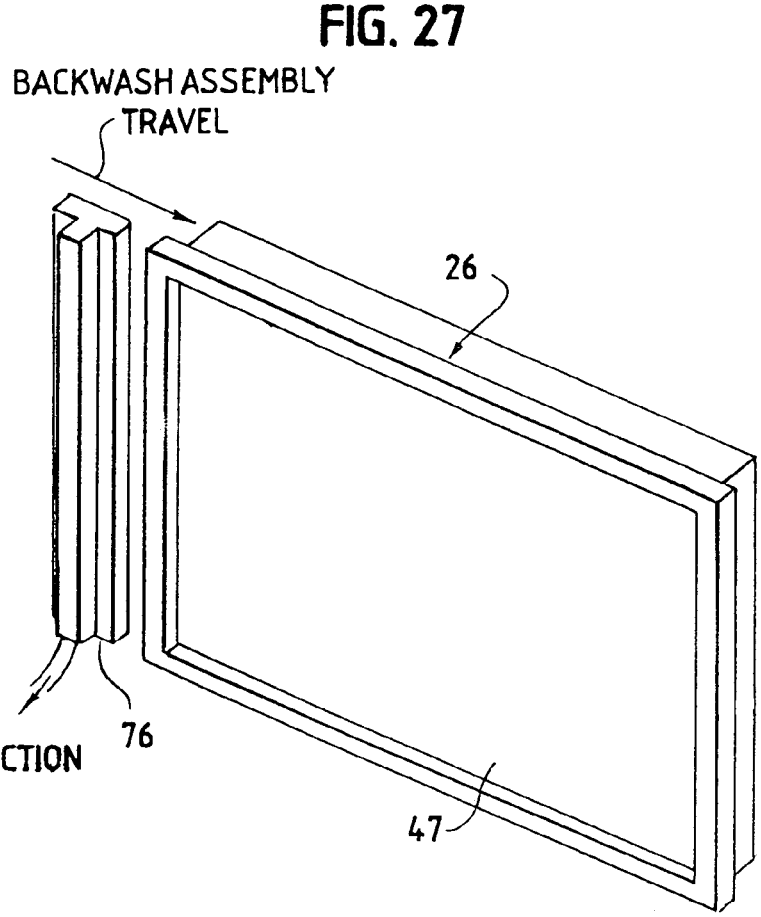
FIG. 27 is a side perspective view of the backwash system component of the present invention of FIG. 26.
Figure 28:
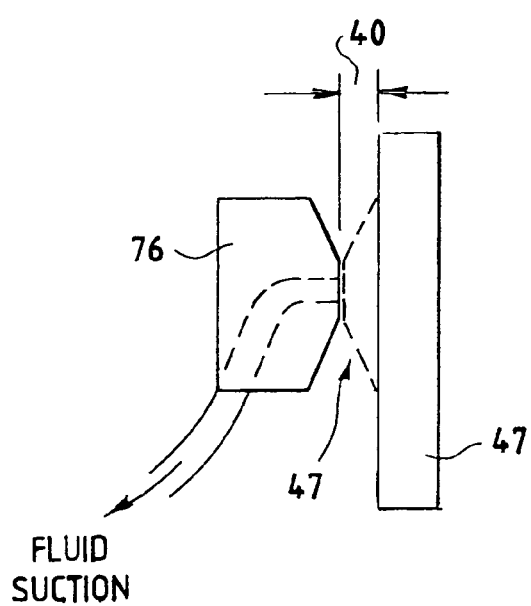
FIG. 28 is a side schematic view of the backwash operation of the present invention.
Figure 29:
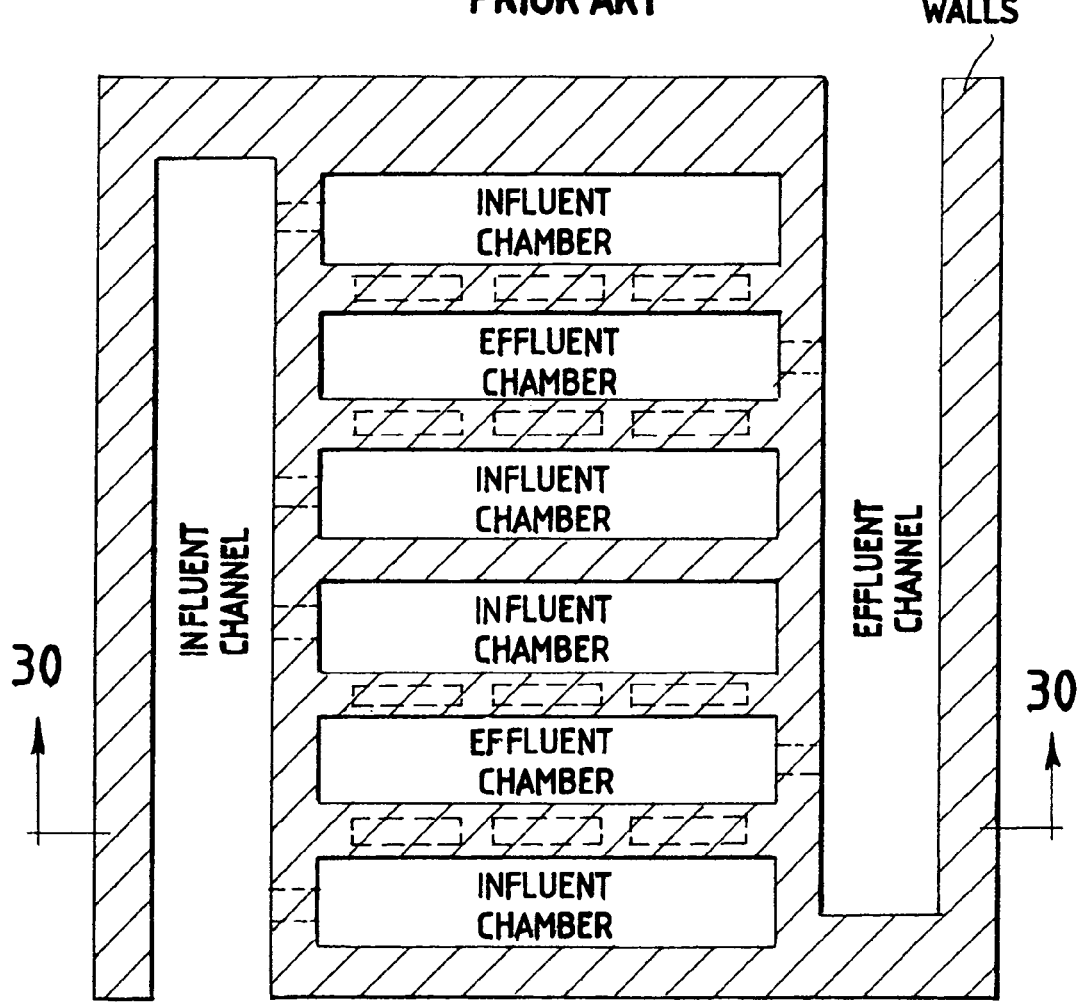
FIG. 29 is a schematic plan view of the general arrangement of a prior art cloth media filtration system.
Figure 30:
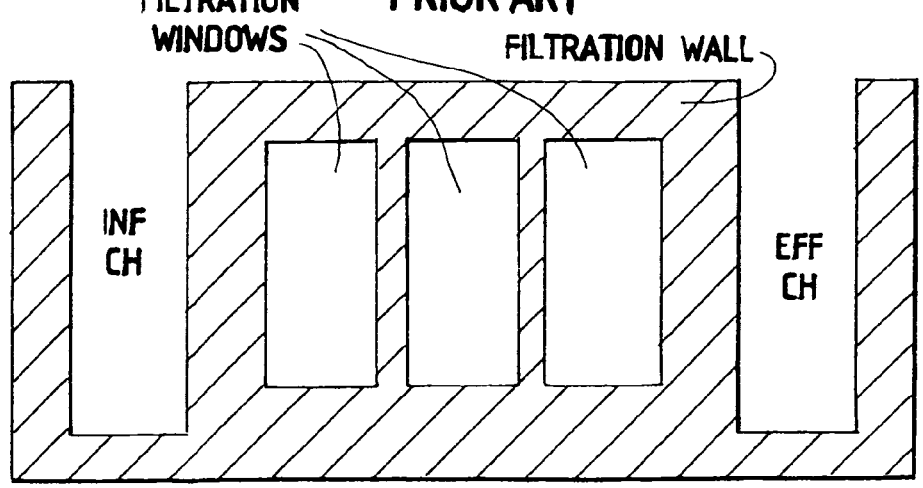
FIG. 30 is a schematic sectional view of a filtration wall and windows of the prior art filtration system taken along line 30-30 of FIG. 29.

The design and structure of filter plate 26 may best be seen by reference to FIGS. 11-13 and 18-18A. As shown, each filter plate or, more generally, filter frame assembly 26 is a generally rectangular frame with a hollow center and consists of side members 41, top member 42 and bottom member 43. A handle or handles 44 attached to top member 42 may also be provided to aid installation, maintenance and/or repair. The side 41, top 42 and bottom 43 members of filter plate 26 form a rectangular box-like structure, the front and back faces 45 of which are fitted with a support screen 46. Cloth filter media 47 (see e.g., FIG. 3) may be stretched across and attached to the front and rear filter faces 45. However, in a preferred embodiment, cloth media 47 is stretched around the whole filter frame assembly 26 which eliminates the risk of unfiltered influent into the effluent plenums 24. Also included are generally v-shaped (in cross-section) top and bottom tensioners 48. Similarly, the side members 41 are provided with side tensioners 49. The support screens 46 function to help the cloth filter media 47 from deforming to the hollow center of filter plate 26, and the tensioners 48 and 49 provide tension to the cloth filter media 47 to form a taught diaphragm for filtering. In addition, top and bottom tensioners 48 act as a rail along the faces 45 of filter plate 26 to create a gap to protect the cloth filter media 47 during backwash operations and to prevent pre-loading as discussed herein. This adjustable or settable gap is shown schematically in FIGS. 26-28.

The bottom frame member 43 includes an oblong hole 62 (see FIG. 18) that is positioned and sized to communicate with oblong hole 33 on the top 32 of effluent plenum 24. A collar 63 extends downwardly from and is coincidental with oblong hole 62. Collar 63 is designed to fit within and create a water-tight seal with the open sleeve 57 of filter frame support mount 35 and completes the filter plate/effluent plenum interface 58. In this manner, untreated influent passes through the cloth filter media 47, is filtered and the filtered effluent passes through oblong hole 62 of bottom frame member 43, into oblong hole 33 into effluent plenum 24, as hereinafter described in more detail. In this manner, there is only one area of possible penetration of influent flow into the effluent plenum 24.

In a preferred embodiment of the present invention, each filter plate 26 is attached to the filter frame support mount 35, and hence, in fluid communication with effluent plenum 24, through the use of a single fastener. Specifically, collar 63 is provided with a plate latch 64. Plate latch 64 is essentially a tab or other similar member extending from one end of collar 63 that is designed to fit under and mate with edge 65 of filter frame support mount 35 (e.g., FIGS. 14 and 15). As a result, plate latch 64 acts as a hinge to restrain one end of collar 63 of filter plate 26.

Figure 17A:
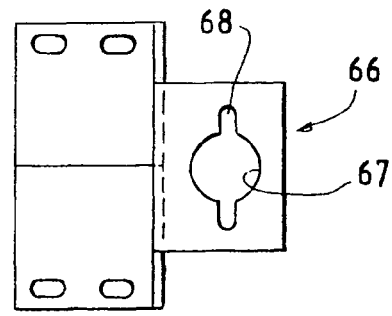
FIG. 17A is a top plan view of a preferred pin retaining bracket of a filter frame assembly of the present invention.
Figure 18:
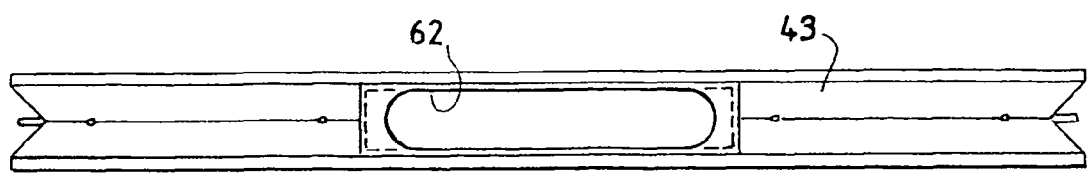
FIG. 18 is a bottom view of the filter frame assembly showing a preferred interface between the filter frame and effluent plenum.
Figure 21:
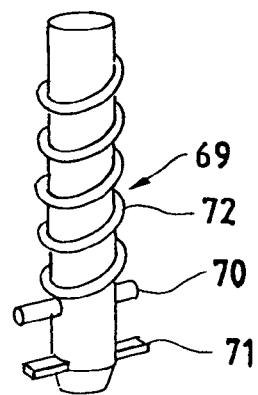
FIG. 21 is a side plan view of a spring loaded fastener of the present invention used to secure the filter frame assembly to the filter frame support mount.

At the end of the bottom member 43 of filter plate 26 opposite latch plate 64, a pin retaining bracket 66 is provided (see FIGS. 14 and 15). Pin retaining bracket 66 includes a key slot 67 and a key way 68 that aligns and mates with key slot 51 and key way 53 of pin retaining plate 50 of filter frame support member 35 (see FIGS. 17-17A and 19). Pin retaining bracket 66 is secured to pin retaining plate 50 through the use of a spring loaded fastener 69. Specifically, in a preferred embodiment, spring loaded fastener includes a pin 70 with a key 71 at one end, and a compressive spring 72 at the other. Thus, in order to secure the pin retaining bracket 66 to pin retaining plate 50, pin 70 is inserted into key slot 67 and key slot 51 so that key 71 passes through key ways 53 and 68. The pin 70 is then rotated so that key 71 engages pin lock groove 52, securing the bracket 66 and plate 50 together. In order to ensure a watertight seal at the plenum/plate interface 58, a closed cell foam gasket seal (not shown) or other suitable gasket may be used. Similarly, each filter plate 26 may include an alignment tab 61 on the end opposite the pin retaining bracket 66. Alignment tab 61 serves to keep adjacent filter plates 26 in alignment on adjacent filter frame support mount 35 of adjacent effluent plenums 24 (see FIG. 17). Other forms of adjustment and retention will be apparent to those of skill in the art.

Having described the majority of the principal components of the present inventions, the typical operation may now be discussed. Specifically, in operation of the preferred embodiment, influent is introduced into bulk influent chamber 12 and is divided between influent channels 14 and 15 (e.g., FIG. 1A). However, only one filtration region (A) will be discussed. The influent flows over influent weir 16 and is diverted via influent baffle 17 to the bottom of the filtration region (see also FIGS. 2-3). The influent flows up through metering slots 60 created by (or alternatively, in) the influent tops 73. As a result of the shape of influent plenum 22, the influent is uniformly distributed over the entire width of the filtration region. The influent then flows through the cloth media 47 of filter plate 26 and is filtered. The filtered flow flows into the sealed effluent plenums 24 via the filter plate/plenum interface 58 and is collected in effluent channel 18, either through the use of an effluent baffle 20 arrangement or an automatic slide gate 27 arrangement.

Figure 22:
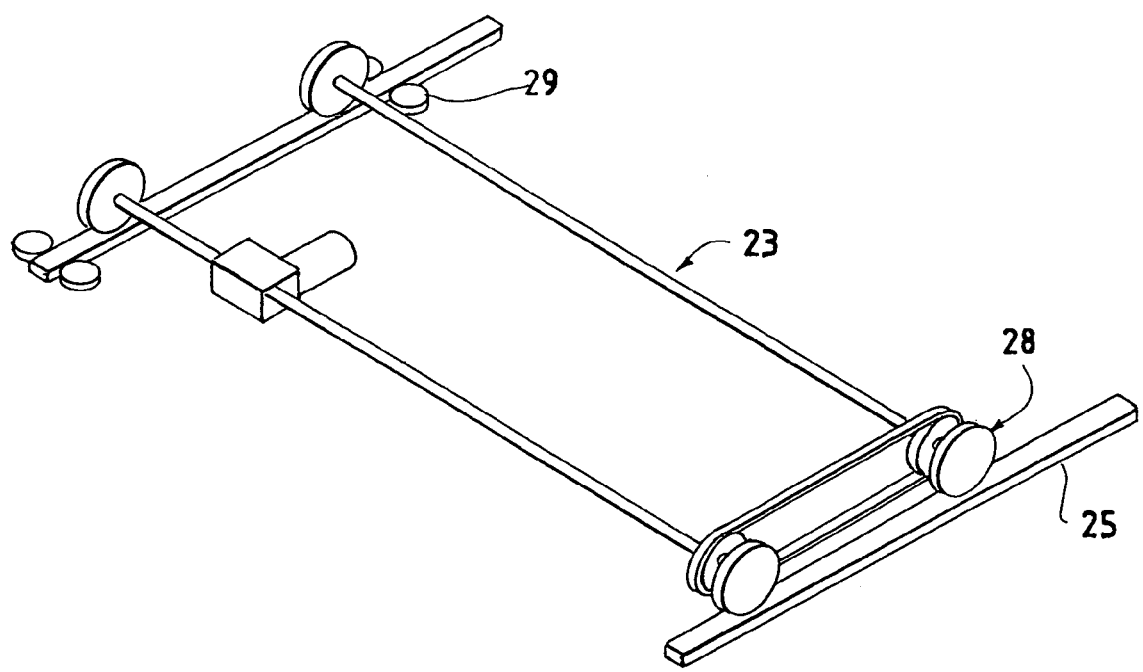
FIG. 22 is a schematic view of the general configuration of the motion imparting components of a typical traveling bridge assembly of the present invention.
Figure 23:
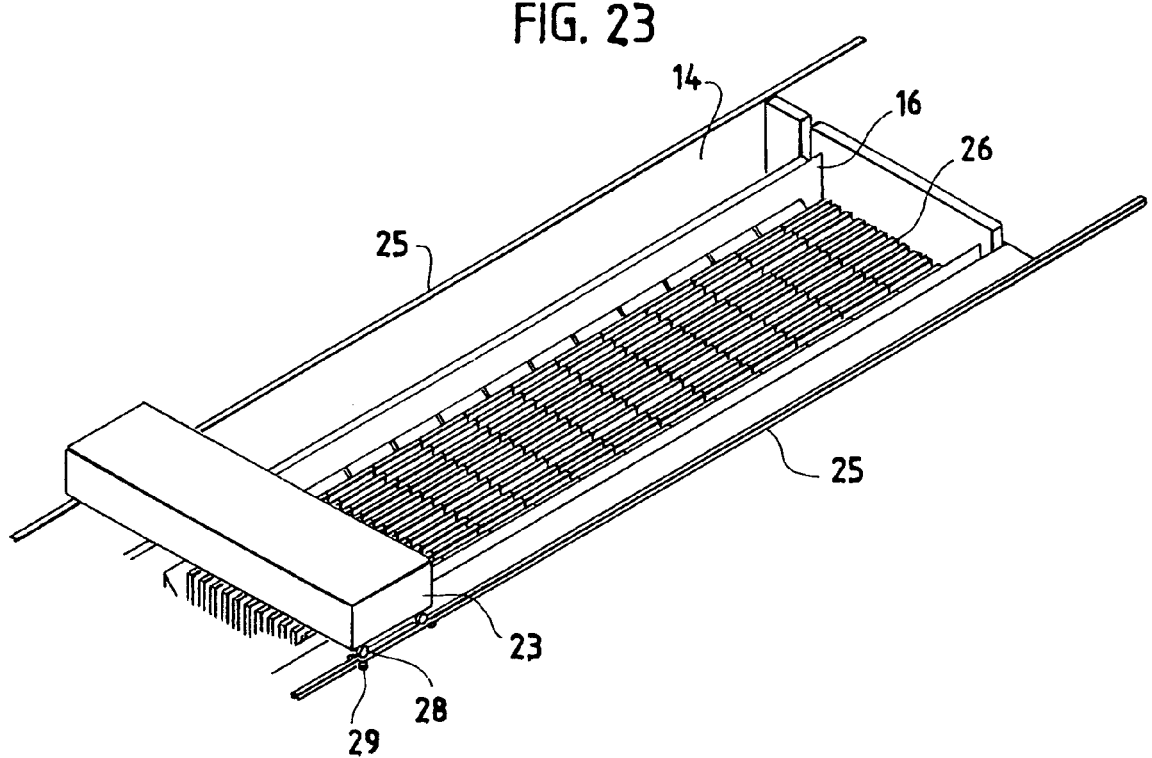
FIG. 23 is a perspective view of the general configuration of a typical traveling bridge assembly of the present invention shown in a first position.
Figure 24:
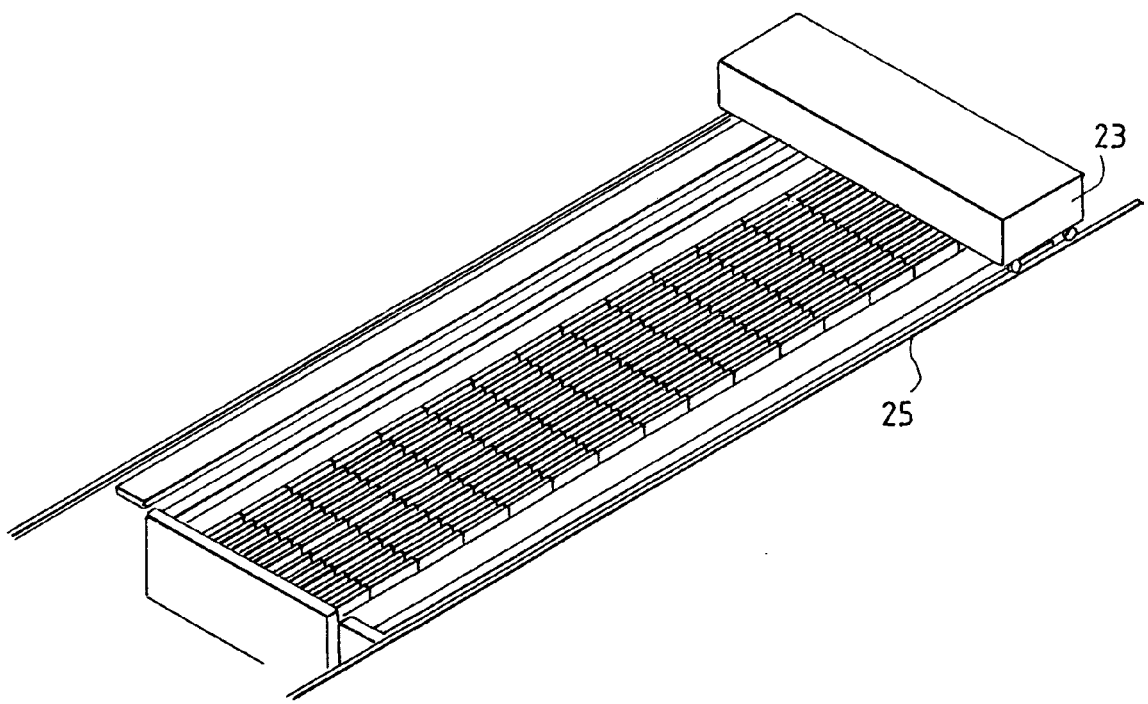
FIG. 24 is a perspective view of the general configuration of a typical traveling bridge assembly of the present invention shown in a second position.
Figure 25:
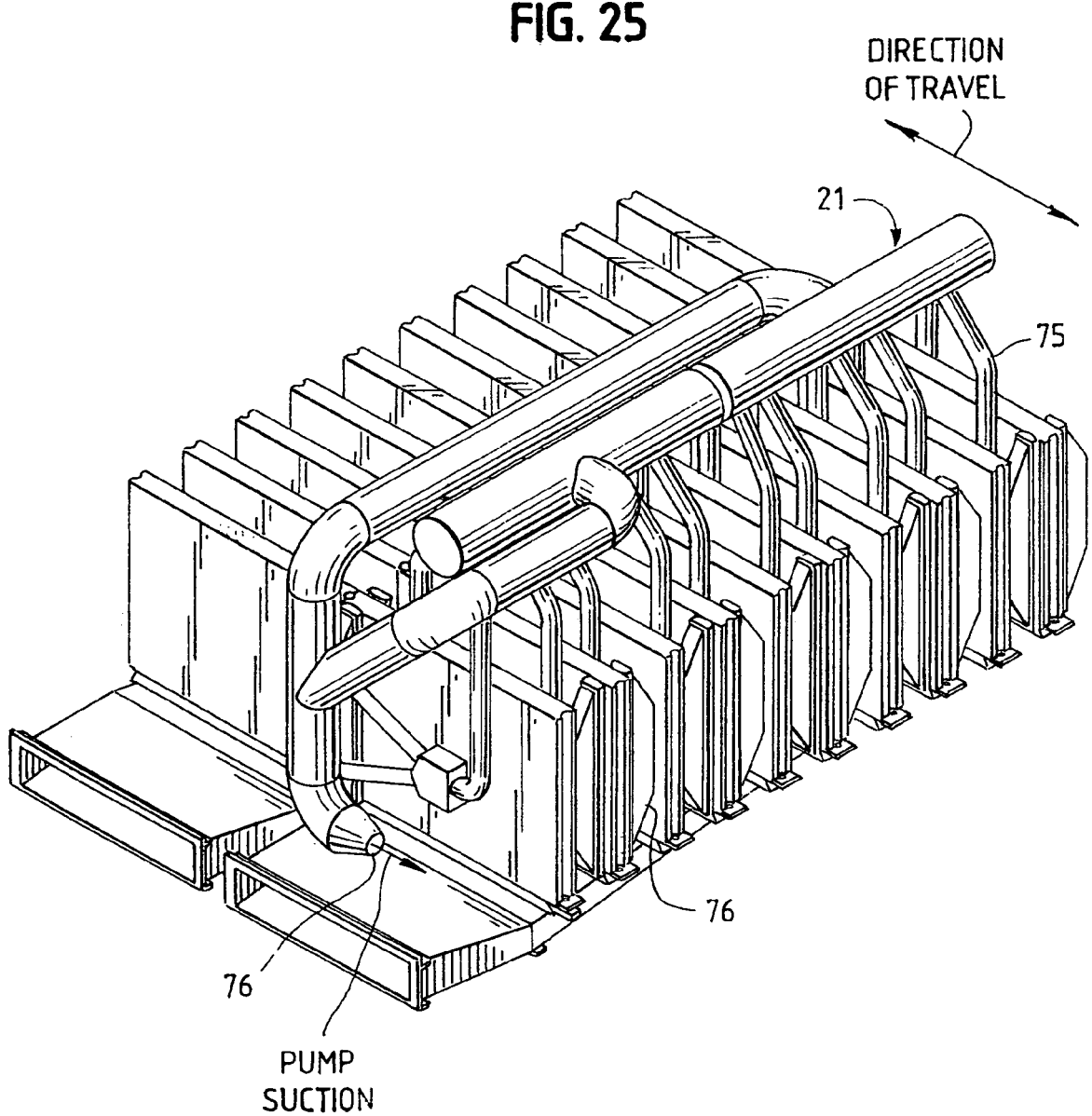
FIG. 25 is a side perspective view of selected components of a typical traveling bridge assembly showing the overall backwash system components of the present invention.

Since the cloth media 47 becomes clogged over time, it is necessary to periodically backwash the cloth filter media 47. A traveling bridge assembly 23 is used to house and carry the necessary components for backwashing and other operations. In general, traveling bridge assembly 23 travels along the length of a filtration region (or filtration basin 10) from a first position (FIG. 23) to a second position (FIG. 24), and back again. Traveling bridge assembly 23 may include wheels 28 that roll along rails 25 on top of filtration basin 10. Alignment wheels 29 (see FIG. 22) may also be included to help guide and align traveling bridge assembly 23 during travel.

The backwash system 21 of the present invention may better be seen by reference to FIGS. 25-28. In general, the backwash system assembly includes suction headers 75 connected to a suction pump 76. A backwash shoe 76 is positioned to ride along the cloth filter media 47 on the front and back faces 45 of each of the adjacent rows of filter plates 26. In a preferred embodiment of the present invention, backwash shoe 76 rides along top and bottom tensioners 48 of filter frame assembly 26, thereby producing a gap 40 between the cloth filter media 47. This reduces wear on the cloth filter media 47 and eliminates preload and its associated problems.

Thus, during a typical backwash operation, the backwash shoes 76 are pulled along the longitudinal rows of filter plates 26 by traveling bridge assembly 23 and its associated backwash headers 75 of backwash assembly 21. In a preferred embodiment of the present invention, only half of a row of filter plates is backwashed in each direction of travel of the traveling bridge 23. That is why, in a preferred embodiment, half of the pin retaining plates 50 are on one side and half on the other side of the filter frame support mount 35. Backwashing will also start and stop at the same place as the traveling bridge assembly moves from its first to second position and returns.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" is sometimes used herein in the singular, it will be understood that there are a plurality of inventions as described and claimed.

Various features of the present inventions are set forth in the following claims.

What is claimed is:

1. A method of treating water or wastewater in a filtration basin using at least one filter plate comprising the steps of
   providing an influent flow of water or wastewater to be treated to an influent channel which receives the influent flow, introducing said influent flow from said channel to the bottom of the filtration basin and uniformly distributing said influent flow along the length and width of the bottom of the filtration basin using an influent plenum having metering slots, said influent plenum being at the bottom of the filtration basin;

filtering said influent flow with said at least one filter plate supporting a cloth filter media said at least one said filter plate having a hollow interior;

discharging the filtered effluent with a relatively constant flow velocity and reduced head loss through at least one effluent plenum sealed from unfiltered influent, said at least one effluent plenum being in fluid communication with said hollow interior of said at least one filter plate, the filtered effluent being discharged from the filter basin through said at least one effluent plenum; and periodically cleaning the cloth filter media supported by the at least one filter plate with suction.

2. The method of claim 1 wherein said at least one filter plate is periodically cleaned by backwashing using a backwash assembly.

3. The method of claim 2 wherein the backwash assembly includes a traveling bridge that traverses the length of the filter basin having suction headers that create suction along the cloth filter media of said at least one filter plate to remove debris trapped on said cloth filter media.

4. The method of claim 1 wherein said influent channel includes a weir extending along its length to permit adjustment of the influent flow along the filtration basin and a baffle along the length of the filtration basin to direct the influent flow to said influent plenum.

5. The method of claim 1 wherein said influent plenum and said at least one effluent plenum are generally trapezoidally shaped, complimentary to one another and located along the bottom of the filter basin.

* * * * *